US012529309B2

(12) United States Patent
Haiz et al.

(10) Patent No.: US 12,529,309 B2

(45) Date of Patent: Jan. 20, 2026

(54) DOWNHOLE ROCK MECHANICS CHARACTERISATION TOOL, ASSEMBLY AND METHOD

(71) Applicant: ENI S.P.A., Rome (IT)

(72) Inventors: Silvia Haiz, San Donato Milanese (IT); Andrea Biondi, Venice (IT); Mauro Favaretto, Venice (IT)

(73) Assignee: ENI S.P.A., Rome (IT)

( * ) Notice: Subject to any disclaimer, the term of this patent is extended or adjusted under 35 U.S.C. 154(b) by 726 days.

(21) Appl. No.: 17/640,404

(22) PCT Filed: Sep. 4, 2020

(86) PCT No.: PCT/IB2020/058258

§ 371 (c)(1),
(2) Date: Mar. 4, 2022

(87) PCT Pub. No.: WO2021/044367

PCT Pub. Date: Mar. 11, 2021

(65) Prior Publication Data

US 2022/0381675 A1 Dec. 1, 2022

(30) Foreign Application Priority Data

Sep. 4, 2019 (IT) ........................ 102019000015584

(51) Int. Cl.
*E21B 49/06* (2006.01)
*E21B 10/48* (2006.01)
(Continued)

(52) U.S. Cl.
CPC .............. *E21B 49/06* (2013.01); *E21B 10/48* (2013.01); *E21B 10/02* (2013.01); *E21B 25/00* (2013.01); *G01N 2203/0019* (2013.01)

(58) Field of Classification Search
CPC ........ E21B 49/06; E21B 10/48; E21B 10/485; E21B 25/00; E21B 10/02; G01N 2203/0019
See application file for complete search history.

(56) References Cited

U.S. PATENT DOCUMENTS 2,032,509 A * 3/1936 Shanor .................... E21B 49/06 175/403
4,300,397 A 11/1981 Brest van Kempen
(Continued)

FOREIGN PATENT DOCUMENTS

CN 103728175 A 4/2014
EP 0 559 286 A1 9/1993
(Continued)

OTHER PUBLICATIONS

Egyptian Office Action dated Nov. 10, 2022 from corresponding Egyptian Patent Application No. 2020121993, 5 pages.
International Search Report dated Dec. 10, 2020 for PCT Appl. No. PCT/IB2020/058258.
Written Opinion dated Dec. 10, 2020 for PCT Appl. No. PCT/IB2020/058258.
(Continued)

*Primary Examiner* — Nicole Coy
*Assistant Examiner* — Jennifer A Railey
(74) *Attorney, Agent, or Firm* — Ruggiero McAllister & McMahon LLC

(57) ABSTRACT

The present disclosure relates to the drilling of oil wells and more particularly to a testing tool, a testing assembly and method for use in measuring selected rock mechanics characteristics downhole.

36 Claims, 16 Drawing Sheets

(51) Int. Cl.
*E21B 10/02* (2006.01)
*E21B 25/00* (2006.01)

(56) References Cited

U.S. PATENT DOCUMENTS

| | | | | |
|---|---|---|---|---|
| 5,216,917 | A | 6/1993 | Detournay | |
| 5,310,013 | A | 5/1994 | Kishino | |
| 5,670,711 | A | 9/1997 | Detournay et al. | |
| 2005/0016727 | A1 | 1/2005 | Fields | |
| 2005/0133258 | A1 | 6/2005 | Veneruso | |
| 2005/0284629 | A1 | 12/2005 | Reid et al. | |
| 2011/0094801 | A1 | 4/2011 | Buchanan et al. | |
| 2013/0008719 | A1* | 1/2013 | Moon | E21B 49/02 175/58 |
| 2014/0208826 | A1* | 7/2014 | Larter | G01N 11/00 356/70 |
| 2017/0159429 | A1 | 6/2017 | Massey | |
| 2020/0291735 | A1* | 9/2020 | Feng | E21B 49/06 |

FOREIGN PATENT DOCUMENTS

| | | | |
|---|---|---|---|
| EP | 2 295 709 | A1 | 3/2011 |
| RU | 2 319 007 | C1 | 3/2008 |
| RU | 100131 | U1 | 12/2010 |
| RU | 2 647 519 | C1 | 3/2018 |
| WO | 2011/004183 | A2 | 1/2011 |

OTHER PUBLICATIONS

Chinese First Office Action dated Mar. 29, 2023 from corresponding Chinese Patent Application No. 202080075320.7, 19 pages.

Saudi Arabia Office Action dated Dec. 27, 2023 from corresponding Saudi Arabia Patent Application No. 522431850, 13 pages.

Eurasian Search Report dated Nov. 25, 2022 from corresponding Eurasian Patent Application No. 202290760, 4 pages.

Australian Examination Report No. 1 from corresponding Australian Patent Application No. 2020341183, 5 pages.

* cited by examiner

DOWNHOLE ROCK MECHANICS CHARACTERISATION TOOL, ASSEMBLY AND METHOD

CROSS-REFERENCE TO RELATED APPLICATIONS

This patent application claims priority from Italian Patent Application No. 102019000015584 filed on Sep. 4, 2019, the entire disclosure of which is incorporated herein by reference, and is a national phase application under 35 U.S.C. § 371 of International Patent Application No. PCT/IB2020/058258 filed on Sep. 4, 2020, the contents of which are incorporated by reference herein in their entirety.

BACKGROUND OF THE DISCLOSURE

1. Field of the Disclosure

The present invention relates to the drilling of oil wells and more particularly to a testing tool, a testing assembly, and a method for use in measuring selected rock mechanics characteristics downhole.

2. Description of the Related Art

It is useful, particularly in exploration wells, to gather core samples for analysis in a laboratory. Such samples of the well formation can provide useful characterization data that can be used, for example, to assess wellbore stability.

In this connection, with oil and gas operations, a core sample is often taken from a formation at various stages of exploration and production. Core samples are useful as they provide a real sample of the well formation from which geologists can analyze characteristics of the well. The core sample is often taken during the drilling of exploration, appraisal, production, or injection wells. In this respect, the core sample may be taken at set intervals according to a well plan, or may be taken on an ad hoc basis as and when the engineer or geologist requires the data to make decisions.

FIG. 1*a* shows a conventional arrangement of a formation 100 wherein a well 101 has been drilled. It may be desirable to take core samples at the end region 102 of the well 101, such as at a first core sample location 103, or at a position away from the end 102 of the well 101 and into the side wall of the well 101, such as at a second core sample location 104. Typically, a core sample 105, which may have been taken from either of the first or second core sample locations, is brought to the surface for analysis. In this connection, FIG. 1*b* shows a known arrangement of a core sampling tool 106 positioned within the drill string 107, but not at its end. The drill string 107 has a drill bit 108, and one or more core samples can be taken from a core sampling location 109, which is spaced from the drill bit 108. The drilling may stop for a period of time to retrieve a core sample and then continue.

There are a number of commercial offerings in the field of coring tools. For example, oilfield services company Baker Hughes offers a traditional coring tool, HT30® Max Core Barrel System, which can gather large core samples co-directional to the well direction and retrieve them to the surface for analysis. Another oilfield services company, Halliburton, offers a side wall coring tool, RSCT®, which acquires core samples from the side wall of the well, and retrieves them for analysis. Various companies also offer core sample analysis equipment, both for use in a fixed laboratory and for testing core samples at the well site. In this connection, Epslog's Wombat core analysis tool is used to measure properties on cores, and can be used in a laboratory or at the well site.

There are several problems with taking core samples for testing in the conventional manner. Firstly, when the core sample is removed from the formation and transported to the surface, even if it is not taken to a laboratory far away from the well site, it is no longer in the original tensional state that it is in when in its natural place. This can adversely impact the quality of the wellbore stability model, which can be generated from analysis of the core sample. The core sample is, moreover, often damaged and/or excessively fractured such that it can prove impossible to carry out analysis of the sample. This increases non-productive time, as another sample must be obtained.

There are also significant costs and time involved in recovering a sample, and transporting it to a laboratory for testing, particularly if the laboratory is several thousand kilometers from the sampling area. Recovering and transporting the sample must be done with care to maintain its integrity, which again involve time and expense. Furthermore, other operations may be held up while the core sample is obtained, transported, and analyzed.

As with all oilfield operations, there is a desire, from a safety standpoint, to reduce the number of steps that involve manual labor. Coring operations typically require the running of a coring tool, which involves the making up of an entire drill string, and then the retrieval of the core sample by breaking an entire drill string. Both the making and breaking of the drill string are typically a labor intensive and potentially dangerous activity. Furthermore, the transportation of the core sample for analysis can present logistical safety issues. It is therefore desirable from a safety standpoint to reduce the number of made up drill strings and transported core samples.

The present invention attempts to address one or more of these problems.

In this connection, rock characterization parameters, which are typically calculated from analysis of core samples, include uniaxial (or otherwise termed "unconfined") compressive strength (UCS) and internal friction angle (F). UCS is a measure of a material's strength, and is defined in industry standard glossary—Schlumberger Oilfield Glossary—as the maximum axial compressive stress that a right-cylindrical sample of material can withstand under unconfined conditions—the confining stress is zero. It is also known as the uniaxial compressive strength of a material because the application of compressive stress is only along one axis—the longitudinal axis—of the sample. The internal friction angle (F) is a measure of the ability of a unit of rock or soil to withstand a shear stress. It is the angle measured between the normal force and resultant force that is attained when failure just occurs in response to a shearing stress. The coefficient of friction is equal to the tangent of the internal friction angle.

Where a formation is subjected to a tensional state, for example, by being under significant pressure, it is desirable to measure the UCS and F in situ, i.e., where it is subjected to the stress. As mentioned above, removal of a core sample has drawbacks, as the change in local environment will alter the tensional state of the sample after it has been removed from the formation, which can corrupt the measurements taken.

The present invention seeks to overcome the aforementioned problems with core sampling and the determination of UCS and F, particularly for formations subjected to a tensional state.

SUMMARY

According to a first aspect of the invention, there is provided a downhole tool for performing downhole rock characterization tests on a test site of a formation, the tool comprising at least one surface preparation cutter and at least one testing cutter, wherein the at least one surface preparation cutter is configured for removing debris from between the test site and the tool, in preparation for engagement of the at least one testing cutter with the test site. The tool allows a downhole rock characterization test to be performed rather than taking a test sample of the formation and bringing it to the surface to be tested in the traditional fashion. This has significant advantages including retaining the sample in its original tensional state, ensuring that the sample is not damaged and/or excessively fractured before testing, increasing productive time by not requiring the sample to be brought to the surface, improving safety of operations by not requiring tools at the rig site to handle the core sample and run tools into and out of the well to retrieve the sample.

Preferably, the at least one surface preparation cutter is further configured to remove a layer of the test site. This allows the removal of debris/mud cake from the test site so that it can be effectively tested by the testing cutter. Alternatively, the surface preparation cutter may remove a layer of the test site so as to remove a damaged or fractured region of the formation that has been damaged by the drill bit during drilling of the well. This allows removal of the formation that is not intended to be tested, and clears a space for the appropriate test site for the testing cutter to perform tests on.

Preferably, the at least one surface preparation cutter is pre-set to remove a layer substantially 20 mm deep. In this regard, removing around 20 mm of the formation when using a 12% inch (31.1 cm) drill bit is typically enough to remove any damaged formation that would not be suitable for performing tests with the testing cutter. The reachable depth will vary depending on the dimensions of the bit and the corresponding well diameter being drilled or tested upon.

Preferably, the at least one testing cutter is substantially blunt for performing an internal friction angle test. The substantially blunt cutter allows the internal friction angle test to be performed, which would usually need to be performed with the core sample removed and taken to the surface.

Preferably, the at least one testing cutter is substantially sharp for performing an unconfined compressive strength test. The sharp cutter allows an unconfined compressive strength test to be performed downhole rather than removing a core sample and taking it to the surface to perform the unconfined compressive strength test.

Preferably, the at least one testing cutter comprises a sharp cutter for performing an unconfined compressive strength test, and a blunt cutter for performing an internal friction angle test. The use of both a sharp cutter and a blunt cutter allows unconfined compressive strength tests and internal friction angle tests to be performed downhole rather than taking a core sample to the surface to perform both an unconfined compressive strength test and an internal friction angle test on the formation.

Preferably, the surface preparation cutter is configured to be moved through a first circular path for performing surface preparation. The movement of the surface preparation cutter through a circular path allows the clearing of an area to be tested by the testing cutter. Furthermore, rotational movement in a circular path is relatively easily and reliably achieved when the surface preparation cutter is driven by a motor, as the motor can turn a shaft to which the surface preparation cutter is arranged, such that it cuts a circular path, without further linkages or tracks to move the cutter through various shapes.

Preferably, the testing cutter is configured to be moved through a second circular path for performing one or more of an internal friction angle test or a uniaxial (unconfined) compressive strength test. The movement of the testing cutter through a second circular path allows the same circular path that has been cleared by the surface preparation cutter to be tested, or a smaller circular path within the larger circular path cut out by the surface preparation cutter to be tested.

Conveniently, the second circular path is within the circumference of the first circular path. This allows the path of the testing cutter to only test the formation that has been cleared of debris or cleared of fractured formation by the surface preparation cutter. This leads to more accurate testing of the desired formation.

Preferably, the sharp cutter and the blunt cutter are integrated into one testing cutter. This allows the one testing cutter to be able to perform internal friction angle tests and unconfined compressive strength tests. This provides advantages over configurations wherein the sharp cutter and blunt cutter are separate. For example, there is no need for additional components that carry each type of cutter. Reducing the number of components has benefits in terms of ease of manufacturing, and increased reliability. Preferably, the testing cutter has a profiled cutting edge that is beveled.

Conveniently, the at least one surface preparation cutter comprises a plurality of surface preparation cutters, and the at least one testing cutter comprises a plurality of testing cutters. This allows for more rapid surface preparation and/or the testing of multiple areas at once, and/or the acquisition of more accurate results, as the measured force along the rotational axis of the testing cutter and the value of the cutting torque can be taken from each of the testing cutters and averaged, or inconsistent data can be removed leading to a more reliable test. The use of a plurality of surface preparation cutters reduces the stress on each individual surface preparation cutter.

Conveniently, the at least one surface preparation cutter and at least one testing cutter are mounted for relative movement such that they are alternately positionable in active cutting and passive retracted states. This allows the surface preparation cutters and testing cutters to be movable between a cutting state and a retracted state, such that the surface preparation and testing can act in turn. Preferably, the downhole tool is further configured such that the at least one surface preparation cutter can be selectively moved from a first position of the tool for removing debris to a second position of the tool for allowing the at least one testing cutter to perform a test. This allows the tool to perform both surface preparation and testing without the need to run a new tool into the well, or even move the drill string to present another tool to the formation. This saves time in performing the testing operation.

Conveniently, the downhole tool is further configured such that the at least one testing cutter can be selectively moved from said first position for the at least one surface preparation cutter to remove debris, to said second position for the at least one testing cutter to perform a test. This allows the tool to perform both surface preparation and testing without the need to run a new tool into the well, or even move the drill string to present another tool to the formation. This saves time in performing the testing operation.

Preferably, the at least one surface preparation cutter and the at least one testing cutter are linked by a mechanical linkage such that movement of the surface preparation cutter from the first position of the tool to the second position of the tool causes movement of the testing cutter from the first position to the second position. The use of a mechanical linkage allows the surface preparation cutter and testing cutters to be arranged in one tool, rather than being arranged in different tools within the BHA, in which case the drill string and BHA would need to be moved after the surface preparation cutters have prepared the surface, to bring the testing cutters to the test site for testing.

Conveniently, the at least one surface preparation cutter and the at least one testing cutter are configured to move relative to each other by means of a hydraulic piston arrangement. The use of a hydraulic piston arrangement provides a reliable means of moving the cutters relative to each other.

The downhole tool preferably further comprises a core drill bit configured to translate the at least one surface preparation cutter and the at least one testing cutter to the test site. This allows the two types of cutters to be mounted on a single component, i.e., the core drill bit, which can be translated to the test site, rather than translating each cutter individually. This can provide a supporting base from which the cutters can project to perform the surface preparation and testing.

Preferably, the core drill bit is translated at an angle relative to the axial direction of the well at the test site. Conveniently, the core drill bit is translated in a direction substantially perpendicular to the axial direction of the well at the test site. This presents the surface preparation cutters and testing cutters to the formation at a right angle.

According to a further aspect of the present invention, there is provided a downhole tool assembly comprising a tool as defined above, the assembly comprising a load bearing structure, within which components of the tool can be isolated from the well environment, one or more characteristics of the environment within the load bearing structure being adjustable to match those of the well environment. The adjustment of the characteristics within the load bearing structure allows the balancing of characteristics to ensure the safe and accurate operation of the tool, by ensuring that the tool is not exposed to dangerous conditions, which may damage the tool, in particular the seals or other delicate components of the tool.

Preferably, the one or more characteristics include one or more of pressure and temperature. Variance of these characteristics can significantly affect the effectiveness of the components. The balancing or management of pressure and temperature ensures the tool operates as desired.

Conveniently, the core drill bit is configured to move from within the load bearing structure to outside the load bearing structure. This allows the core drill bit to be able to translate to the test site to perform surface preparation or testing.

The downhole tool assembly preferably further comprises a compensator configured to pump fluid into or out of the load bearing structure such that the internal pressure of the load bearing structure is balanced with the local external pressure of the load bearing structure. This ensures safe and accurate operation of the tool by ensuring that the internal pressure does not become dangerous and/or damage or affect components of the tool.

The downhole assembly preferably further comprises deployable immobilizing means for bracing the assembly against the well interior. This provides a fixation against which forces can be applied, and also measured, to either perform surface preparation or testing of the formation. Without an immobilizing means, the tool could be able to move in the wellbore, making it difficult to perform the required surface preparation or testing.

Preferably, the immobilizing means comprises one or more shoe components for bearing against the well wall for creating a fixing reaction during testing operations. The shoe components provide a fixation for stabilization of the tool.

The downhole tool assembly may conveniently further comprise a connection means for connecting to drill pipe or tools of a bottom hole assembly. This allows the downhole tool to be assembled in a drill string for running to the test site. The assembly of the downhole tool in the drill string allows the downhole tool to be positioned where it can perform tests between each stand of drill pipe being added in a drilling operation, for example, or on demand where required throughout the drilling operation. Furthermore, this allows the downhole tool to be connected to other components and tools in the BHA, allowing it to be run directly behind other measurement devices, for example, which is likely to be the desired location where the rock characterization data is to be acquired.

The downhole tool assembly preferably further comprises a power module to deliver power to a motor for translating the drill core bit to the test site. This provides the advantage of a reliable system for translating the drill core bit to the test site and ensures that the drill core bit can be moved to the test site when required.

Preferably, the power module is a battery. This provides the advantage of not being reliant on the circulation of mud through the system to turn a turbine to power the motor, thus allowing the tests to be performed where there is no circulation. Furthermore, the use of a battery allows the tool to be arranged without a continuous power supply from the surface, which can have significant drawbacks and can be unreliable in practice.

The downhole tool assembly may conveniently further comprise at least one force sensor configured to determine a first force at the at least one surface preparation cutter. The use of a force sensor has the advantage of being able to provide measurement of a reaction force to confirm that the surface preparation cutter has engaged the debris/mud cake to be cleared, or that it has engaged the formation, thus allowing accurate movement of the surface preparation cutter to prepare the test site for testing.

The downhole tool assembly preferably further comprises at least one force sensor and at least one torque sensor configured to determine a second force and a torque measurement at the at least one testing cutter. This provides the advantage of being able to use the measured force along the rotational axis of the testing cutter and measured cutting torque to determine the internal friction angle or unconfined compressive strength.

The downhole tool assembly conveniently further comprises a processing means for calculating the internal friction angle or the unconfined compressive strength from the second force along the rotational axis of the testing cutter and the measured cutting torque. This allows the tool to be able to calculate the internal friction angle or unconfined compressive strength directly, without having to send the data for processing at the surface. This has many advantages, as transmission to the surface can be problematic in that it can take a significant amount of time, and data can often be lost or reduced in quality during the transmission due to noise or interference. The processing of the data within the tool overcomes these drawbacks. Furthermore, the volume of the processed data may be significantly smaller than the raw force data, and so transmission of the processed data only may be faster than the transmission of the raw force data. Alternatively, the stored raw data or processed data may be stored in the tool during the run, and downloaded from the tool when the tool is recovered to the surface at the end of the run.

According to a further aspect of the present invention there is provided a method of performing a rock characterization test on a test site within a wellbore, the method comprising the steps of: arranging a downhole tool or downhole tool assembly as defined above downhole in a well; translating the at least one surface preparation cutter to a test site, in order to remove debris located along the translational path; translating the at least one testing cutter to the test site; and engaging the testing cutter with the test site. This method allows a downhole rock characterization test to be performed rather than taking a test sample of the formation and bringing it to the surface to be tested in the traditional fashion. This has significant advantages including retaining the sample in its original tensional state, ensuring that the sample is not damaged and/or excessively fractured before testing, increasing productive time by not requiring the sample to be brought to the surface, improving safety of operations by not requiring tools at the rig site to handle the core sample and not having to run tools into and out of the well to retrieve the sample.

Preferably, once positioned downhole at the test site, the tool assembly is pressure balanced such that one or more measurement components are encapsulated within an enclosure that is pressured to match a local environmental pressure. The balancing of pressure within the tool aids the safe and accurate operation of the tool by ensuring that the tool is not exposed to dangerous conditions that may damage or adversely affect the tool, in particular the seals or other delicate components of the tool.

The method preferably further comprises the steps of: engaging a blunt cutter with the test site; and measuring the force along the rotational axis of the blunt cutter and the cutting torque. This provides measurements which can be used to calculate rock characteristics. In particular, they can be used to calculate the internal friction angle.

The method preferably further comprises the steps of: engaging a sharp cutter with the test site; and measuring the force along the rotational axis of the sharp cutter and the cutting torque. This provides measurements which can be used to calculate rock characteristics. In particular, they can be used to calculate the unconfined compressive strength.

The method preferably further comprises the steps of: calculating the internal friction angle from the measurements taken using the blunt cutter. This provides the advantage of not requiring the removal of a core sample and subsequent transportation of the core sample to the surface for analysis to determine the internal friction angle.

The method preferably further comprises the steps of: calculating the uniaxial (unconfined) compressive strength from the measurements taken using the sharp cutter. This provides the advantage of not requiring the removal of a core sample and subsequent transportation of the core sample to the surface for analysis to determine the uniaxial (unconfined) compressive strength.

According to a further aspect of the present invention, there is provided a cutter for use in the downhole tool, downhole tool assembly, or method as defined above, wherein the cutter has a profiled cutting edge that is beveled so that it can perform both blunt and sharp cutter functions. Preferably, the bevel has a radius of between 0.1 mm and 0.5 mm.

BRIEF DESCRIPTION OF THE DRAWINGS

Embodiments of the present invention will now be described by way of example and with reference to the accompanying drawings, of which.

DETAILED DESCRIPTION

Figure 1A:
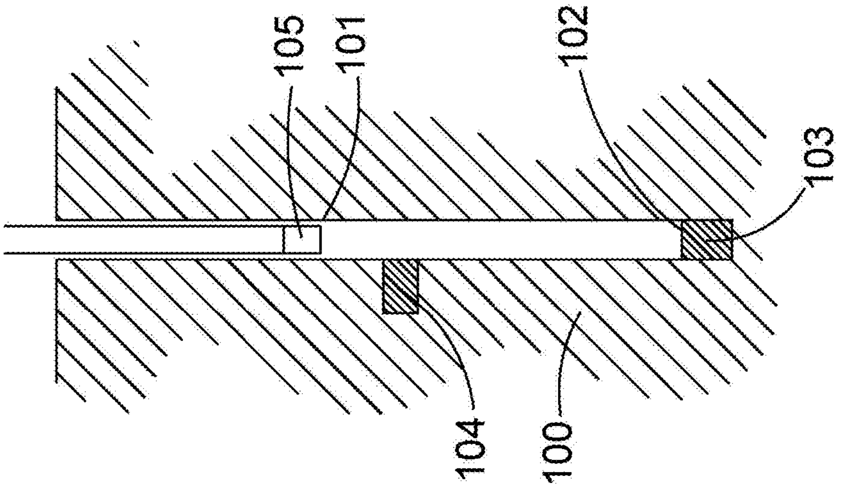
FIG. 1A (PRIOR ART)
FIG. 1*a* shows a schematic view of a prior art arrangement of a well that has been drilled in a formation.
Figure 1B:
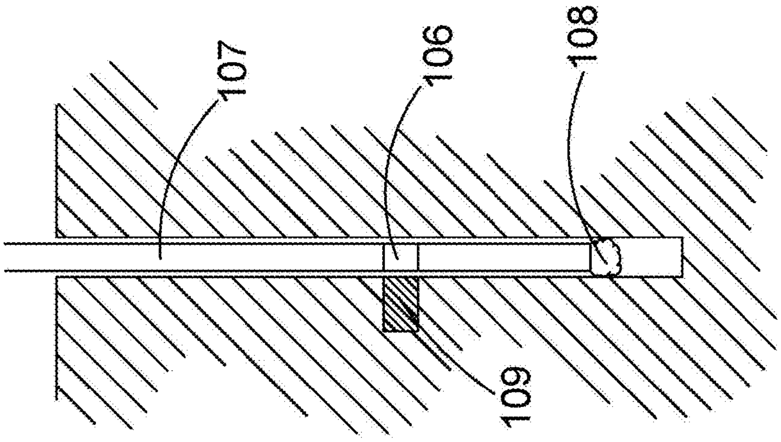
FIG. 1B (PRIOR ART)
FIG. 1*b* shows a schematic view of a prior art drill string comprising a known core sampling tool in a well that has been drilled in a formation.

As discussed above, FIGS. 1*a* and 1*b* relate to known arrangements for taking a core sample from a formation for analysis at the surface.

In contrast, the present invention relates to a method of analyzing rock characteristics downhole and also a rock characterization tool (RCT) and assembly which can be used to perform that method.

Figure 2:
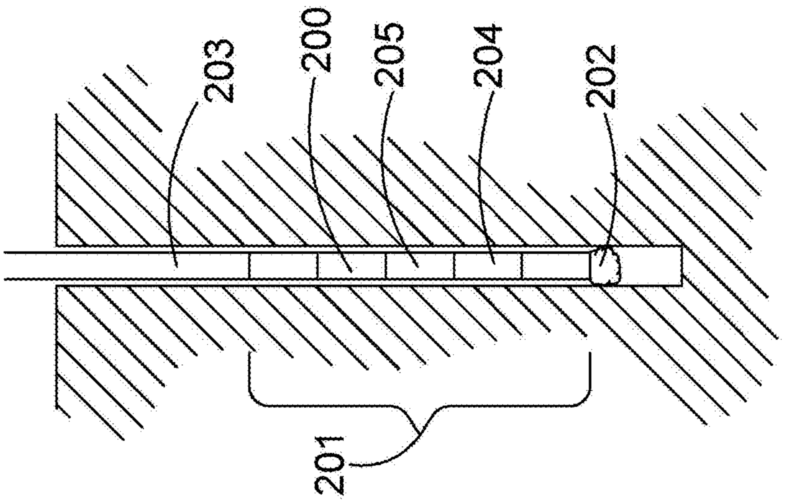
FIG. 2 shows a schematic view of a rock characterization tool (RCT) in accordance with an embodiment of the present invention, the RCT being assembled within a bottom hole assembly and positioned within a well.

In this regard, as shown in the schematic arrangement of FIG. 2, a rock characterization tool (RCT) 200 is configured to be run into the well as part of the bottom hole assembly (BHA) 201. In the described embodiment, the RCT 200 is configured to be positioned around 35-45 meters from drill bit 202. Greater or shorter distances from the drill bit may be used depending on the configuration of the drill string, the formations to be drilled, and the data to be acquired. In this regard, there may be several hundred to several thousand meters of drill string behind the BHA 201. The BHA 201 typically comprises, in addition to the drill bit 202, measurement while drilling (MWD) tools 204, logging while drilling (LWD) tools 205, and/or other equipment located behind the drill bit 202.

In the described embodiment, the RCT 200 is a standalone module; however, it will be understood that the RCT 200 may be integrated within another component of the BHA 201, such as an MWD tool 204 or LWD tool 205, for example.

Where the RCT 200 is a standalone module, it is configured such that it can connect to the other components of the drill string 203. This is typically achieved by a standard threaded connection, although any other connection means known in the art may be used.

Similarly, the RCT 200 is configured such that it can be communicated with when positioned in use in the drill string and in the well. To allow for communication from the surface, the RCT 200 of the present embodiment can use mud pulse telemetry. It will be appreciated that the RCT 200 may use any known communication technique to communicate with the surface, including, for example, wired drill pipe.

Figure 3B:
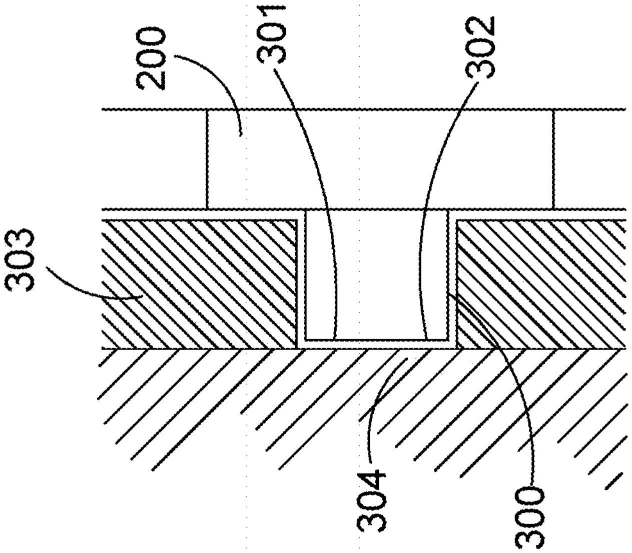
FIG. 3*b* shows a side view of the core drill bit of FIG. 3*a* and the RCT positioned within a well and operated to remove debris from a test site.
Figure 3A:
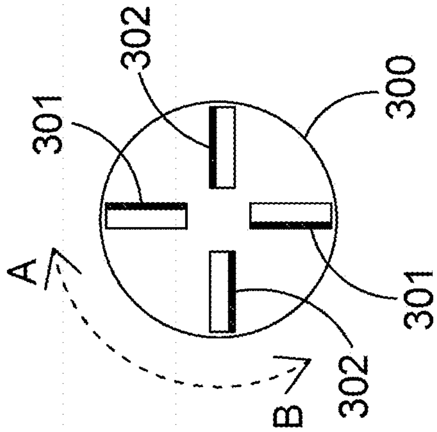
FIG. 3*a* shows a front end view of a core drill bit of the RCT in accordance with an embodiment of the invention.

The RCT 200 comprises a core drill bit 300, shown in FIG. 3*a*, which, in contrast with prior art arrangements, does not remove a core sample from the formation. Instead, the core drill bit 300 comprises one or more surface preparation cutters 301 and one or more testing cutters 302. The surface preparation cutters 301 are used to remove layers of debris 303, as shown in FIG. 3*b*, which have built up on the internal walls of the well. Such debris may comprise, but is not limited to, particulates from the drilling mud which are deposited as a coating on the inside of the wellbore, commonly known as mud cake. The surface preparation cutters 301 are configured to cut through the debris 303 and reveal the surface of the actual formation 304, i.e., the wellbore, upon which the testing cutters 302 can perform tests. In this respect, FIG. 3*b* shows how the surface preparation cutters 301 have cleared through the debris so that the testing cutters 302 are at the face of the formation.

The surface preparation cutters may additionally cut into the formation 304, for example, around 20 mm when using a 31.1 cm drill bit, to remove a portion of the formation which may have been damaged or adversely affected in some way by the drilling operation. This allows the testing cutters 302 to perform the tests on an undamaged and more truly representative formation, to provide more accurate and reliable results. In this regard, the surface preparation cutters 301 clear away the debris from the test site, where the testing cutters 302 will then perform the tests. The surface preparation cutters 301 may clear away a larger area, for example, a large circular area, with the testing cutters 302 being configured to engage the formation 304 at a more focused area, for example, a smaller circular area within the larger cleared area, which has been cleared by the surface preparation cutters 301.

In the described embodiment of FIG. 3*a*, the surface preparation cutters 301 and the testing cutters 302 are mounted on the same core drill bit 300, and each can be selected for use when required. The RCT 200 may be configured to allow selection of the desired cutters, i.e., either surface preparation cutters 301 or testing cutters 302, by either a passive configuration or an active configuration.

In this connection, a passively configured RCT 200 allows selection and switching between the cutters 301, 302 without a dedicated actuator, typically by use of the gearing arrangement already present in the RCT 200 to provide rotation. The drive mechanism of the RCT 200 may have only a single motor, and the gearing arrangement may include reduction gear and/or reverse gear configurations, to allow the surface preparation cutters 301 and testing cutters 302 to be rotated clockwise at various speeds/torques and anti-clockwise at various speeds/torques. As will be understood with reference to FIG. 3*a*, in this configuration, the surface preparation cutters 301 are arranged such that they are effective in performing their surface preparation cuts when rotated in direction A, and not effective in performing their surface preparation cuts when rotated in direction B. On the other hand, the testing cutters 302 are effective in performing their testing cuts or scratches when rotated in direction B, and not effective in performing their testing cuts or scratches when rotated in direction A.

In the presently described embodiment, the core drill bit 300 can hence effectively cut through the debris 303 by direction A rotation to engage surface preparation cutters 301 with the debris 303 to be removed. Once the core drill bit 300 advances to the position shown in FIG. 3*b*, the direction of rotation of the core drill bit 300 can be changed to direction B, thus rotating the testing cutters 302 in the direction required for them to perform their desired function. Each set of cutters may project slightly when rotation is effected in the direction required for those cutters to engage the formation or debris. Torsion springs (not shown) may aid in ensuring that one pair of cutters projects when required, and not the other.

In such a further embodiment, making use of a torsion spring arrangement, the surface preparation cutters 301 can be arranged to project beyond the testing cutters 302 in a first configuration, and the testing cutters 302 may project beyond the surface preparation cutters 301 in a second configuration.

The blades of the testing cutters 302 may be configured such that a substantially blunt cutter edge is offered to the formation upon rotation of the drill core bit 300 in the first direction, and a substantially sharp cutter edge is offered to the formation upon rotation of the drill core bit 300 in the second direction opposite to the first direction.

In this connection, the blunt cutter edge is required to allow measurement of the internal friction angle (F), and the sharp cutter edge is required to allow measurement of the unconfined compressive strength (UCS).

Figure 4:
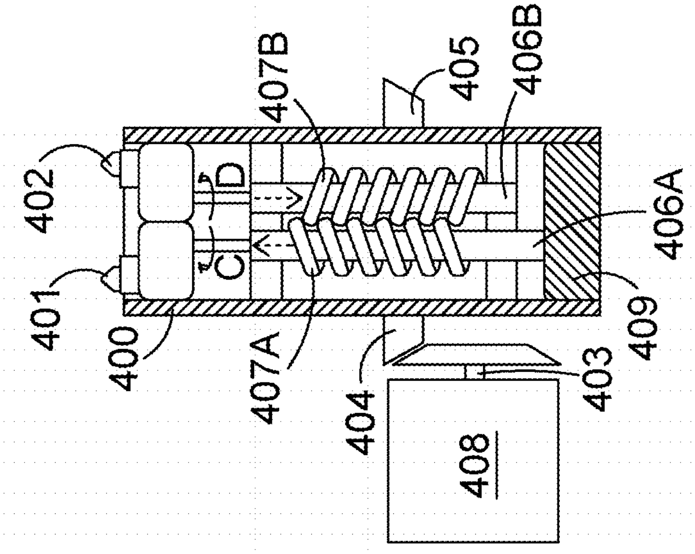
FIG. 4 shows a core drill bit in accordance with an embodiment of the invention.

FIG. 4 shows a cross-sectional view of part of an RCT assembly comprising an active mechanism for moving surface preparation cutters 401 and testing cutters 402 to the forefront of core drill bit 400, ready for surface preparation or testing, respectively. The core drill bit 400 is generally rotatable through the gearing 403, 404, 405.

In this respect, the active mechanism comprises a first screw 406*a* and a second screw 406*b*. The first and second screws 406*a*, 406*b* each have respective helical threaded portions 407*a*, 407*b* which are arranged to be inter-engaging such that clockwise rotation and linear translation in direction C of the first screw 406*a* causes anticlockwise rotation and linear translation in direction D of the second screw 406*b*. The core drill bit 400 is generally rotatable via the gearing 403, 404, 405 by motor 408. The first screw 406*a* is rotated by a motor 409, which does not need to drive the second screw 406*b* because of the previously described arrangement of inter-engaging helical threaded portions 407*a*, 407*b*. The first screw 406*a* is attached to the surface preparation cutter 401, and the second screw 406*b* is attached to the testing cutter 402. The pitch of the threads, length of the shafts, etc., required can be adjusted to meet requirements. The described arrangement is used to move each cutter 401, 402 into position when required, and retract the cutters 401, 402 when they are not required. The embodiment described shows only one surface preparation cutter 401 and one testing cutter 402; however, it will be understood that any number of surface preparation cutters 401 and testing cutters 402 may be used.

The mechanically driven extension and retraction of the first 406*a* and second 406*b* screws could equally be replaced by electrically or hydraulically driven arrangements.

Figure 5A:
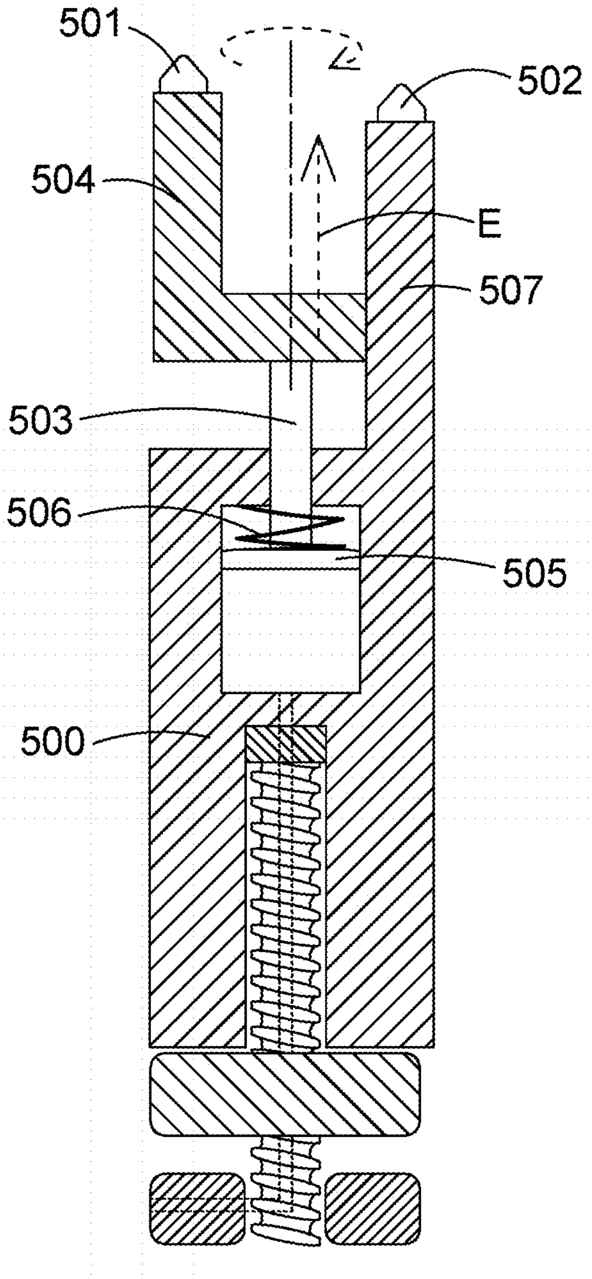
FIG. 5*a* shows a core drill bit in accordance with a further embodiment of the invention.

FIG. 5*a* shows an alternative embodiment of a drill core bit 500 which can be used in an RCT assembly, such as, for example, the RCT assembly of FIG. 4. In this embodiment, the drill core bit 500 uses an active mechanism to move the surface preparation cutter 501 and testing cutter 502 into and out of position. The drill core bit 500 has a central shaft 503 which is connected to a first insert 504 at a first end, and a hydraulically driven piston 505 at the opposite end. The insert 504 houses the surface preparation cutter 501, and is configured to be able to move, relative to the rest of the core drill bit 500, in direction E to bring the surface preparation cutter 501 to the front for use. The testing cutter 502 is mounted in an arm 507 of the drill core bit 500. When the surface preparation cutter 501 has been used and it is desired to bring the testing cutter 502 to the front, the insert 504 may be retracted by the hydraulic piston moving back and spring 506 biasing the insert 504 back into the retracted position. As an alternative to the hydraulic piston arrangement, the movement of the insert 504 may be controlled and driven by other suitable mechanisms, for example, an electrical means.

The embodiment described in FIG. 5*a* shows only one surface preparation cutter 501 and one testing cutter 502; however, it will be understood that a modification of the embodiment is possible to provide a plurality of each of the surface preparation cutters 501 and the testing cutters 502. One such modification would be to provide multiple surface preparation cutters 501 on the insert, and similarly multiple testing cutters 502 on the body of the core drill bit 500. An alternative modification would be to provide multiple inserts, each carrying one or more surface preparation cutters 501. It will be understood that the surface preparation cutter 501 and testing cutter being mounted on the insert 504 and the core drill bit 500, respectively, may be reversed, i.e., with the testing cutter 502 being mounted on the insert 504 and the surface preparation cutter being mounted on the arm 507 of the core drill bit 500.

The testing cutters 502 may moreover be arranged with a blade configuration similar to that previously described with reference to FIG. 3, i.e., with a blunt cutter edge offered to the formation when the drill core bit 500 is rotated in a first direction, and with a sharp cutter edge offered to the formation when the drill core bit 500 is rotated in a second direction opposite to the first direction.

Alternatively, the configuration may comprise three separate and distinct cutters, or three sets of cutters. The cutters of the first set are surface preparation cutters, the cutters of the second set are blunt edge cutters for measurement of the internal friction angle (F), and the cutters of the third set are sharp edge cutters for measurement of the uniaxial compressive strength (UCS). The surface preparation cutters may be mounted on an arm of the drill core bit, as previously described. The blunt edge and sharp edge cutters may be mounted on separate first and second inserts, which can be moved independently using a similar arrangement to the embodiment described with reference to FIG. 5*a*.

Regardless of the cutter deployment method, either through reversing the rotation of the core drill bit and/or through bringing a different cutter to the forefront, the use of the surface preparation cutters along with blunt and sharp cutters on the same drill core bit allows the same general area of the formation to be tested to determine UCS and F.

FIGS. 5*b*-5*h* show alternative embodiments for moving the drill core bit and cutters out from within the tool so that they can perform their function on the wellbore. In these embodiments, the core drill bit and surface preparation and testing cutters are, for ease of reference, labelled respectively as 500, 501, and 502, but it will be understood that the embodiments of FIGS. 5*b*-5*h* are not limited to specific features of the embodiment of FIG. 5*a*.

Figure 5B:
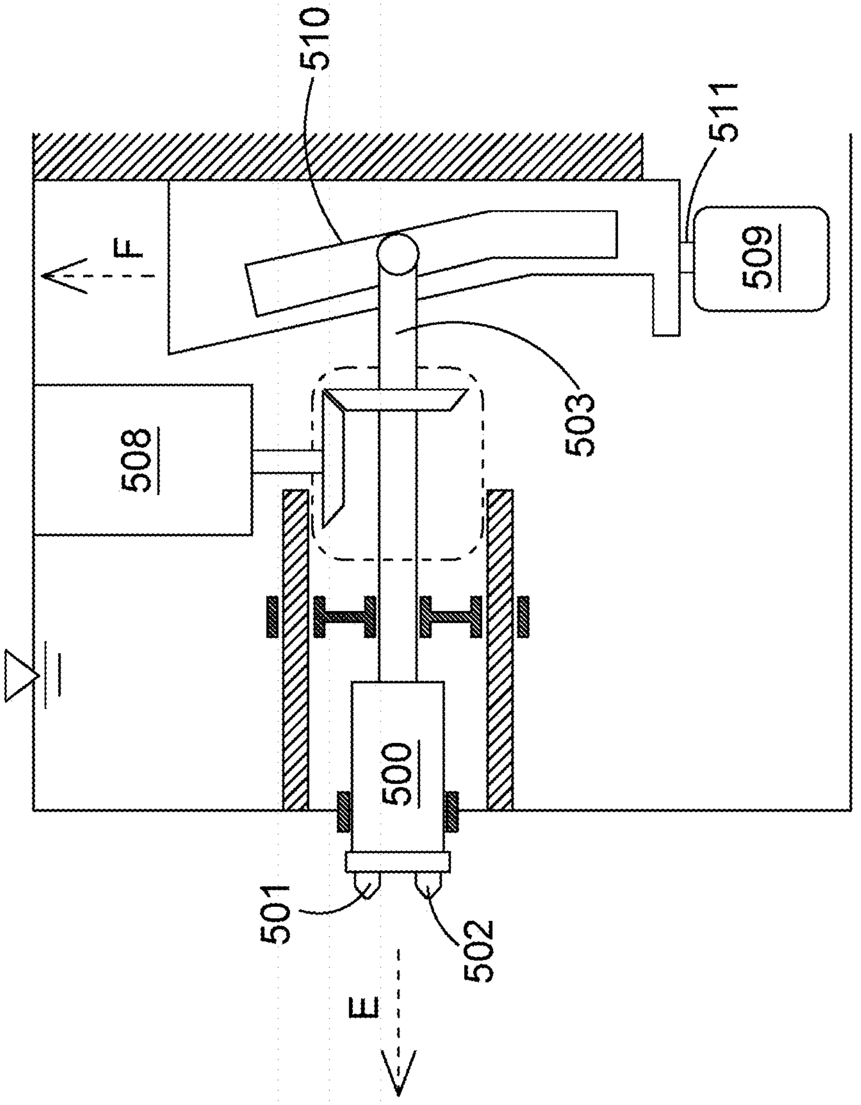
FIG. 5*b* shows an alternative embodiment wherein the core drill bit is advanced by means of an inclined cam.

FIG. 5*b* shows an electro-mechanical subsystem wherein the cutters 501, 502 are rotated using a first electric motor 508. Movement of the core drill bit 500 is achieved by a second electric motor 509 moving an inclined cam 510. The second electric motor 509 may be connected to the inclined cam 510 by a worm gear 511, or any other suitable connection, to transfer the rotational output of the second electric motor 509 to translational movement of the inclined cam 510 in direction F, which causes translational movement of the core drill bit 500 in direction E.

Figure 5D:
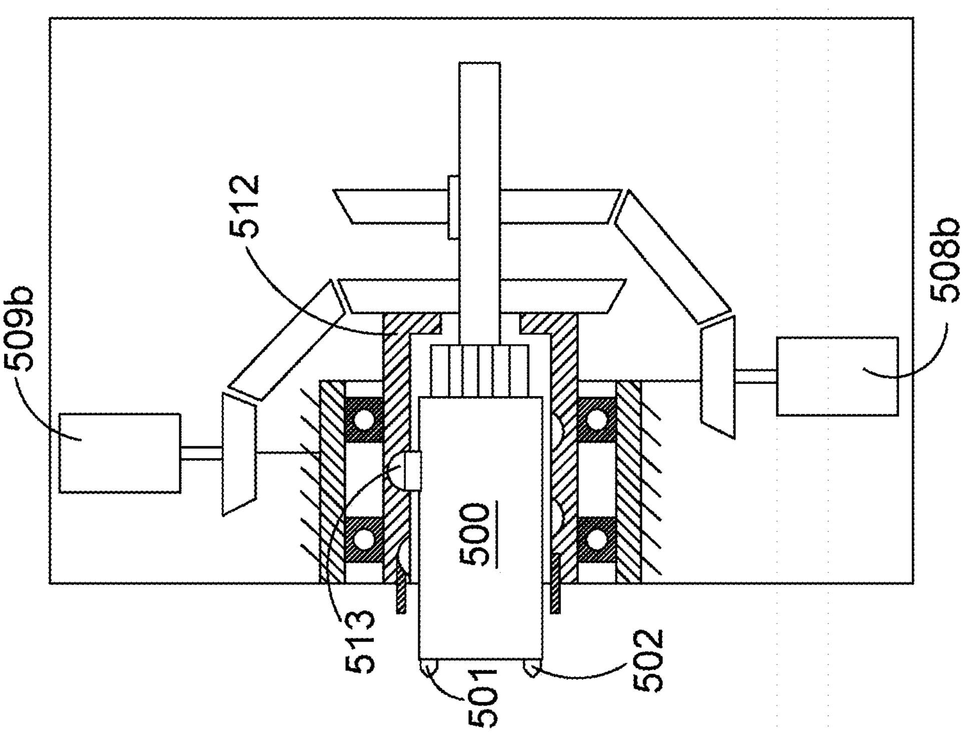
FIG. 5*d* shows an alternative embodiment wherein the core drill bit is advanced by means of a bit holder connected to the core drill bit by means of a helical cam.
Figure 5C:
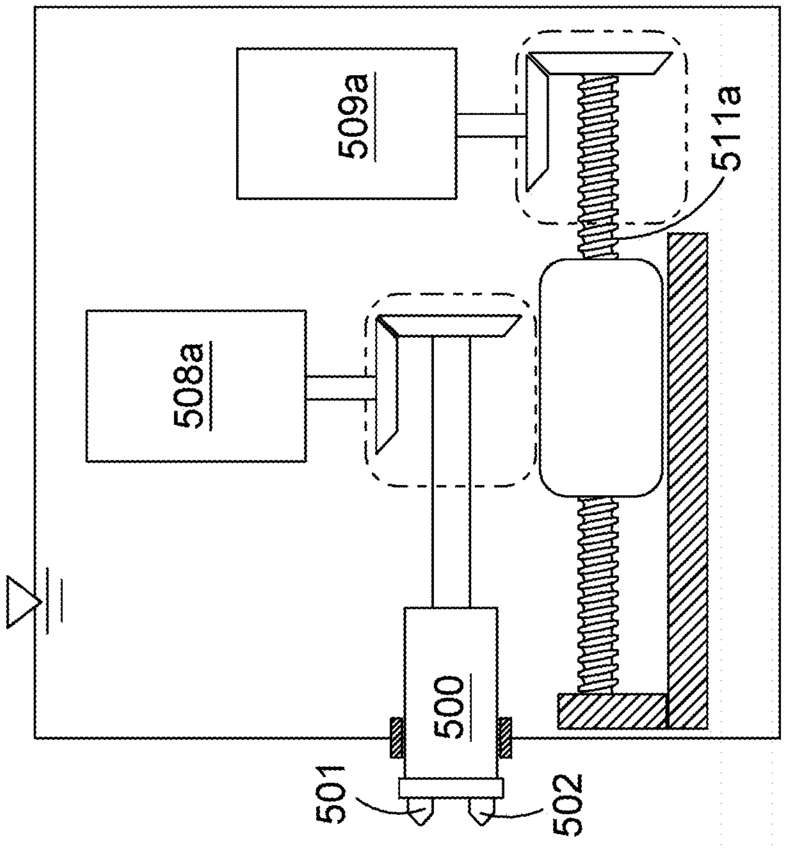
FIG. 5*c* shows an alternative embodiment wherein the core drill bit is advanced by means of a second electric motor connected via a worm gear.

FIG. 5*c* shows another alternative embodiment wherein the core drill bit 500 is moved by means of a second electric motor 509*a* combined with a worm gear 511*a* connected to the core drill bit 500. As shown in FIG. 5*c*, the second electric motor 509*a* is arranged to also move the first electric motor 508*a*, which drives the cutters 501, 502, such that the core drill bit 500 and first electric motor 508*a* are both moved into position together by the second electric motor 509*a* and the worm gear 511*a*. It will be appreciated that a worm gear 511*a* is selected to convert the rotational motion from the second electric motor 509*a* to the translational motion of the core drill bit 500 and first electric motor 508*a*; however, any suitable mechanism may also be used.

FIG. 5*d* shows another alternative embodiment wherein the first electric motor 508*b* is connected to the core drill bit 500 to drive, i.e., rotate, the cutters 501, 502, and the second electric motor 509*b* is connected to a bit holder 512, which is a support member arranged to hold or encase a portion of the core drill bit 500. The bit holder 512 is in engagement with a helical cam 513, such that rotation of the bit holder 512 by the second electric motor 509*b* will cause translational movement of the core drill bit 500. This embodiment allows translational advancement of the core drill bit 500 and rotation of the core drill bit 500.

Figure 5E:
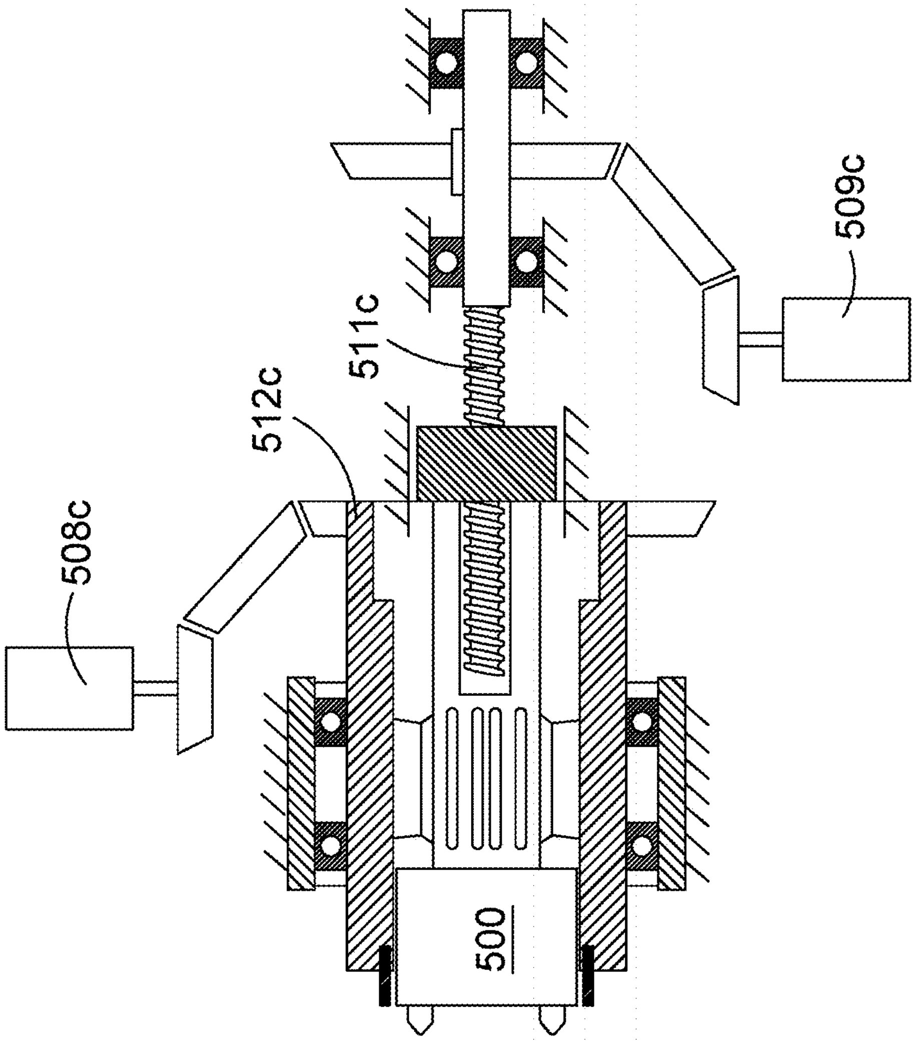
FIG. 5*e* shows an alternative embodiment wherein the core drill bit is advanced by means of a worm gear connected to a second electric motor.

FIG. 5*e* shows an alternative embodiment wherein the first electric motor 508*c* is connected to the core drill bit 500 via a bit holder 512*c*. In this embodiment, the core drill bit 500 is rotated as the bit holder 512*c* is rotated by the first electric motor 508*c*. The second electric motor 509*c* is used to advance the core drill bit 500 by driving a worm gear 511*c*, which is connected to the core drill bit 500.

Figure 5F:
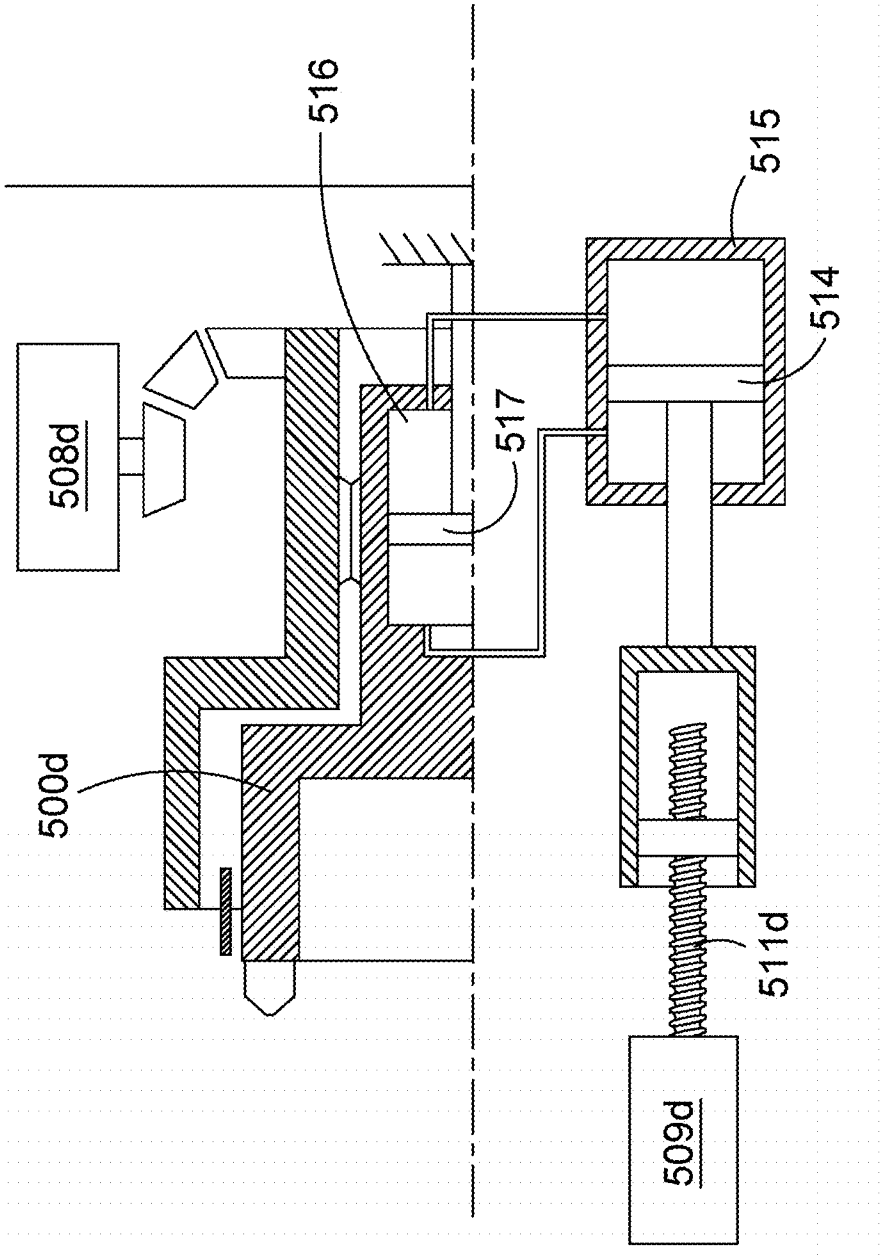
FIG. 5*f* shows an alternative embodiment wherein the core drill bit is advanced by a hydraulic arrangement.

FIG. 5*f* shows an alternative embodiment, which is an electro-mechanical and hydraulic system. In this embodiment, a first electric motor 508*d* is connected to the core drill bit 500*d* to provide rotation of the core drill bit 500*d*. The core drill bit 500*d* is translated by a hydraulic piston wherein a second electric motor 509*d* drives a worm gear 511*d*, which in turn moves a first piston 514 within a first hydraulic cylinder 515. The first hydraulic cylinder 515 is connected to a similar second hydraulic cylinder 516 within the core drill bit 500*d*. A corresponding second piston 517 within the second hydraulic cylinder 516 is fixed; however, the core drill bit 500*d* is arranged to be free to move with respect to the fixed second piston 517. As the first piston 514 within the first hydraulic cylinder 515 moves, hydraulic fluid is pumped into one side of the second hydraulic cylinder 516 and is pumped out of the other side of the second hydraulic cylinder 516, forcing the core drill bit 500*d* to translate outwardly or inwardly, around the fixed second piston 517.

Figure 5G:
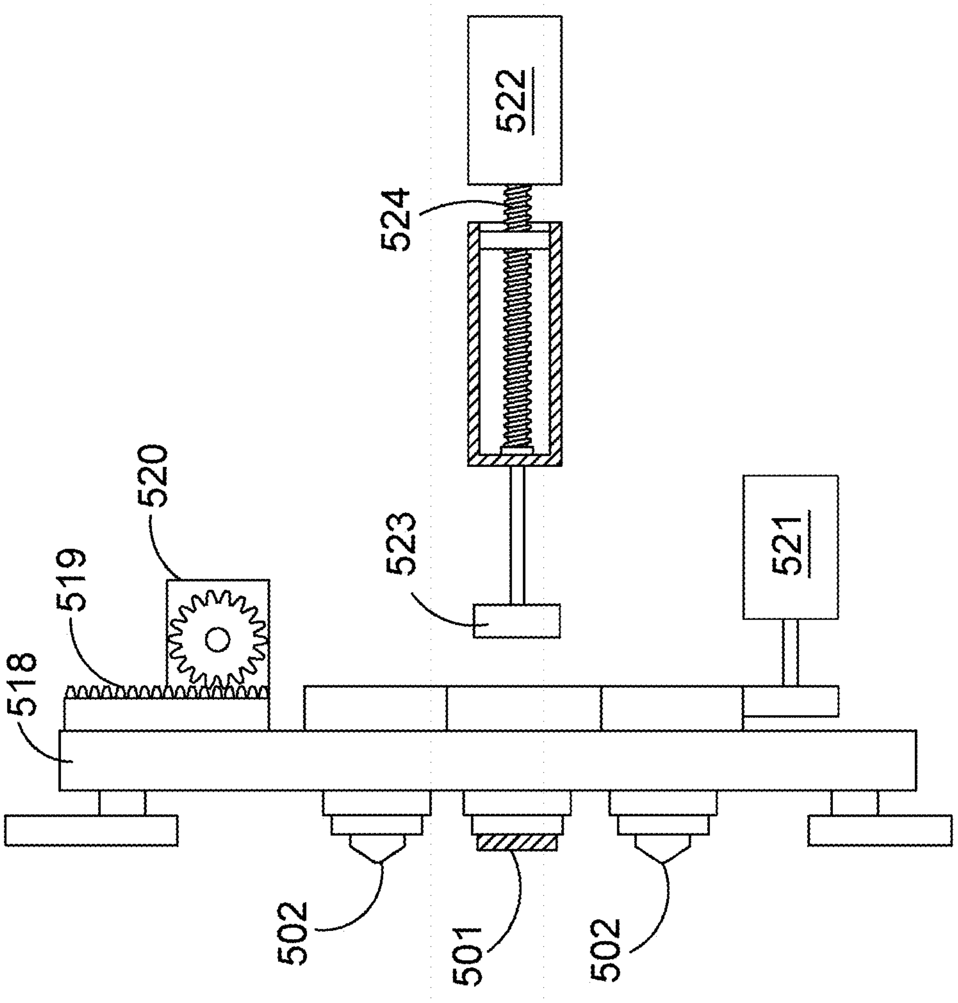
FIG. 5*g* shows an alternative embodiment wherein individual cutters are advanced by a piston driven by a worm gear.

FIG. 5*g* shows another alternative embodiment, wherein various cutters (i.e., surface preparation 501 and testing cutters 502) are positioned on individual dedicated bits which are supported on a slidable structure 518. The slidable structure 518 may be controlled by a worm gear 519 driven by an electric motor 520 or by any other suitable means. The cutters 501, 502 can be rotated by a rotation motor 521, and are translated forward using an advancing motor 522, which in the present embodiment advances an actuator 523 to contact the correct cutter 501, 502 by use of a worm gear 524.

Alternatively, the slidable structure 518 may be a rotatable carousel, in which case the worm gear 519 shown in FIG. 5*g* would be replaced by a suitable arrangement to rotate the carousel such that the correct cutters 501, 502 can be selected.

Figure 5H:
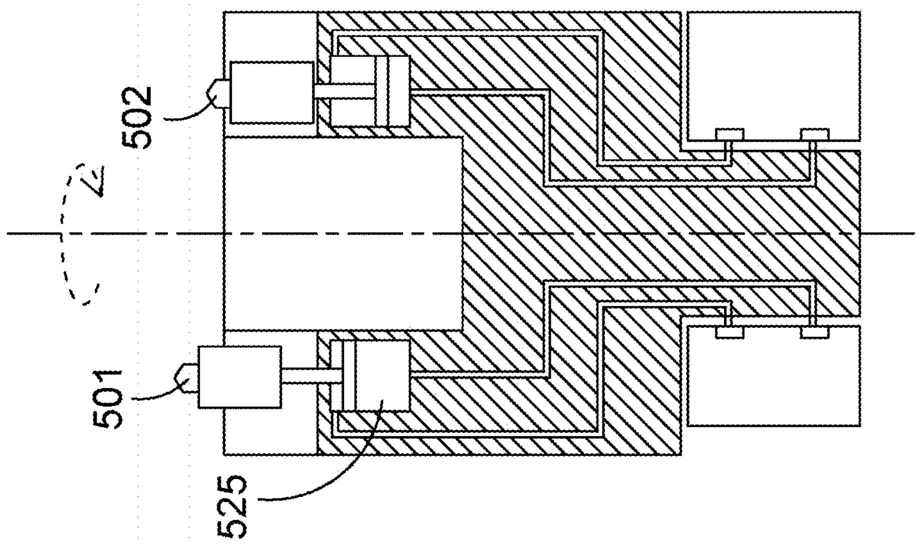
FIG. 5*h* shows an alternative embodiment wherein each cutter has a dedicated hydraulic actuator.

FIG. 5*h* shows an alternative embodiment using dedicated hydraulic actuators for each cutter. The embodiment shown in FIG. 5*h* uses only two cutters 501, 502; however, it will be appreciated that any number of cutters may be used in this embodiment, with corresponding dedicated hydraulic actuators for each cutter. Referring to FIG. 5*h*, the first cutter 501 has a dedicated first hydraulic actuator 525, which is a piston cylinder arrangement whereby hydraulic fluid can be pumped under pressure to one side of the cylinder to cause the piston, and therefore the cutter 501, to translate outwardly. When the cutter 501 is to be retracted, hydraulic fluid can be pumped to the other side of the piston, to move the piston in the opposite direction and thus retract the cutter. The same arrangement is provided separately for the second cutter 502. This embodiment allows each cutter 501, 502 to be controlled individually, and also provides an embodiment whereby the tool body does not need to be divided into parts, like in the embodiment shown in FIG. 5*a* above.

Figure 6:
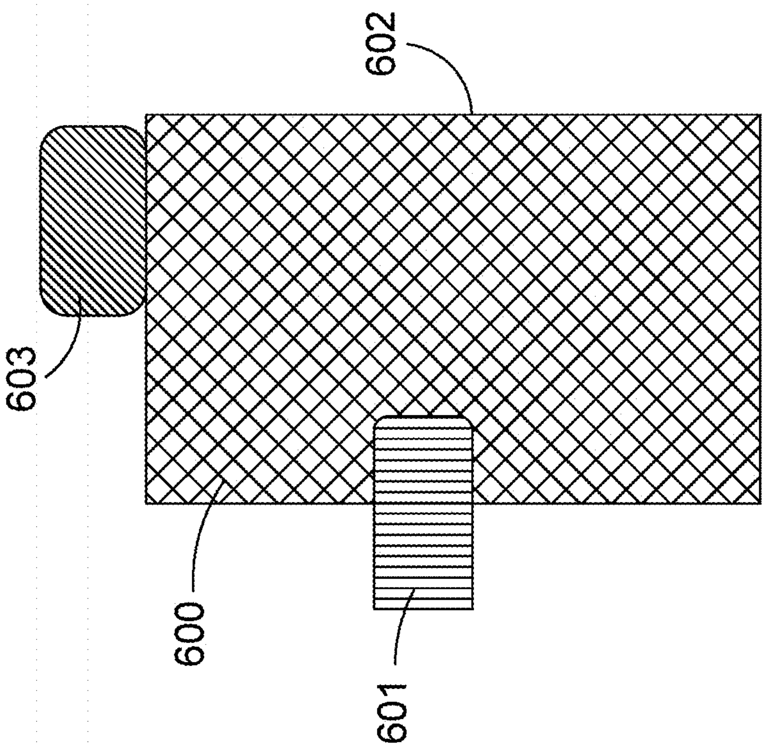
FIG. 6 shows a schematic view of an RCT assembly in accordance with an embodiment of the invention.

Referring now to FIG. 6, this shows a schematic view of an RMT assembly 600 having a core drill 601 which may comprise a core drill according to any of the configurations previously described. Regardless of the configuration of cutters on the core drill bit 601, the surrounding system is designed to provide local environmental stability during the measurement of the formation UCS and F. In this regard, the surrounding system comprises a load bearing structure in the form of an enclosure 602 for isolating internal components from the external drilling mud environment and immersing them in hydraulic oil. A compensator 603 maintains the pressure within the structure 602 to match the external pressure.

Figure 7A:
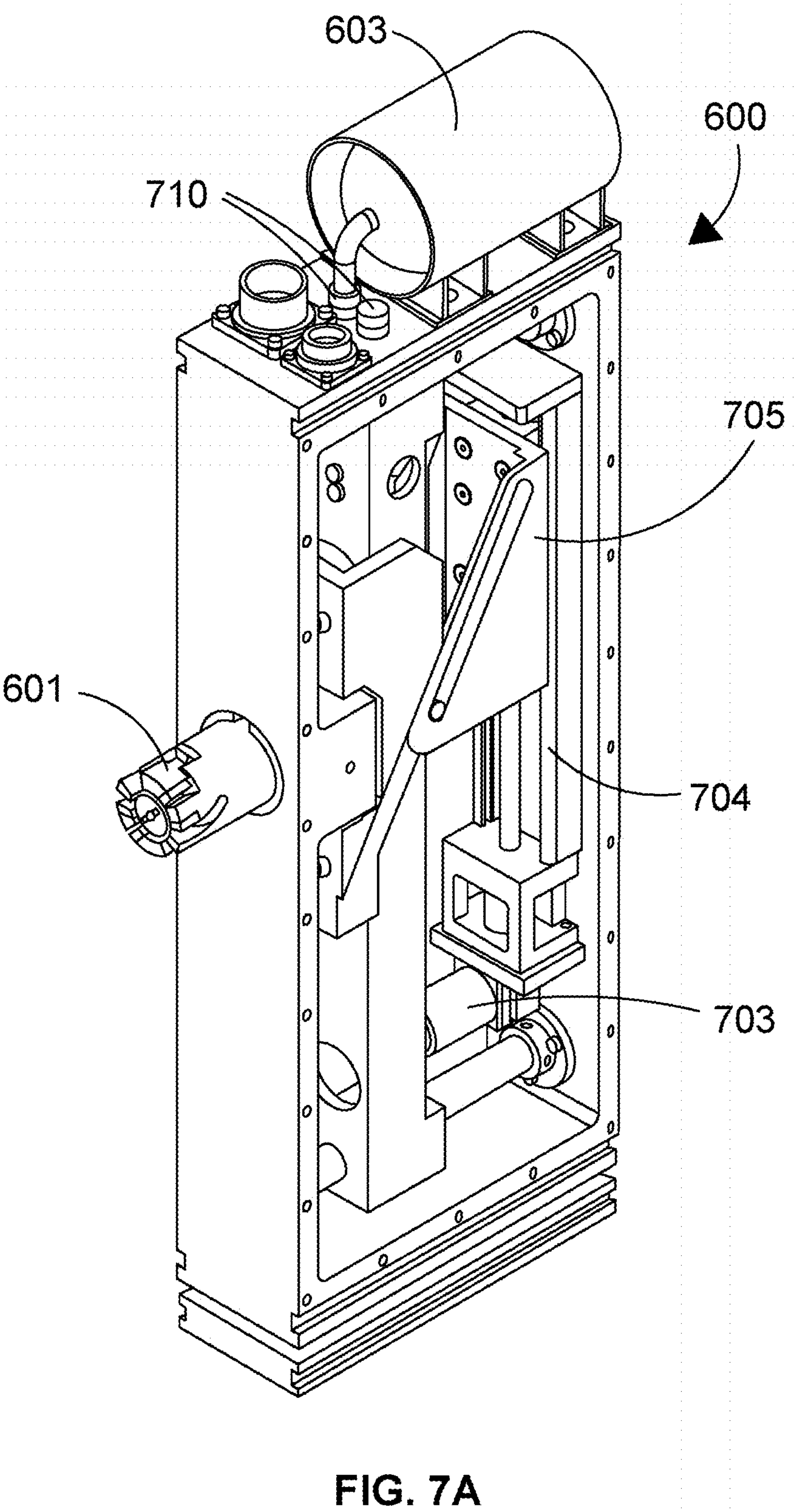
FIGS. 7*a* and 7*b* show two views of the main components of the RCT of FIG. 6.
Figure 7B:
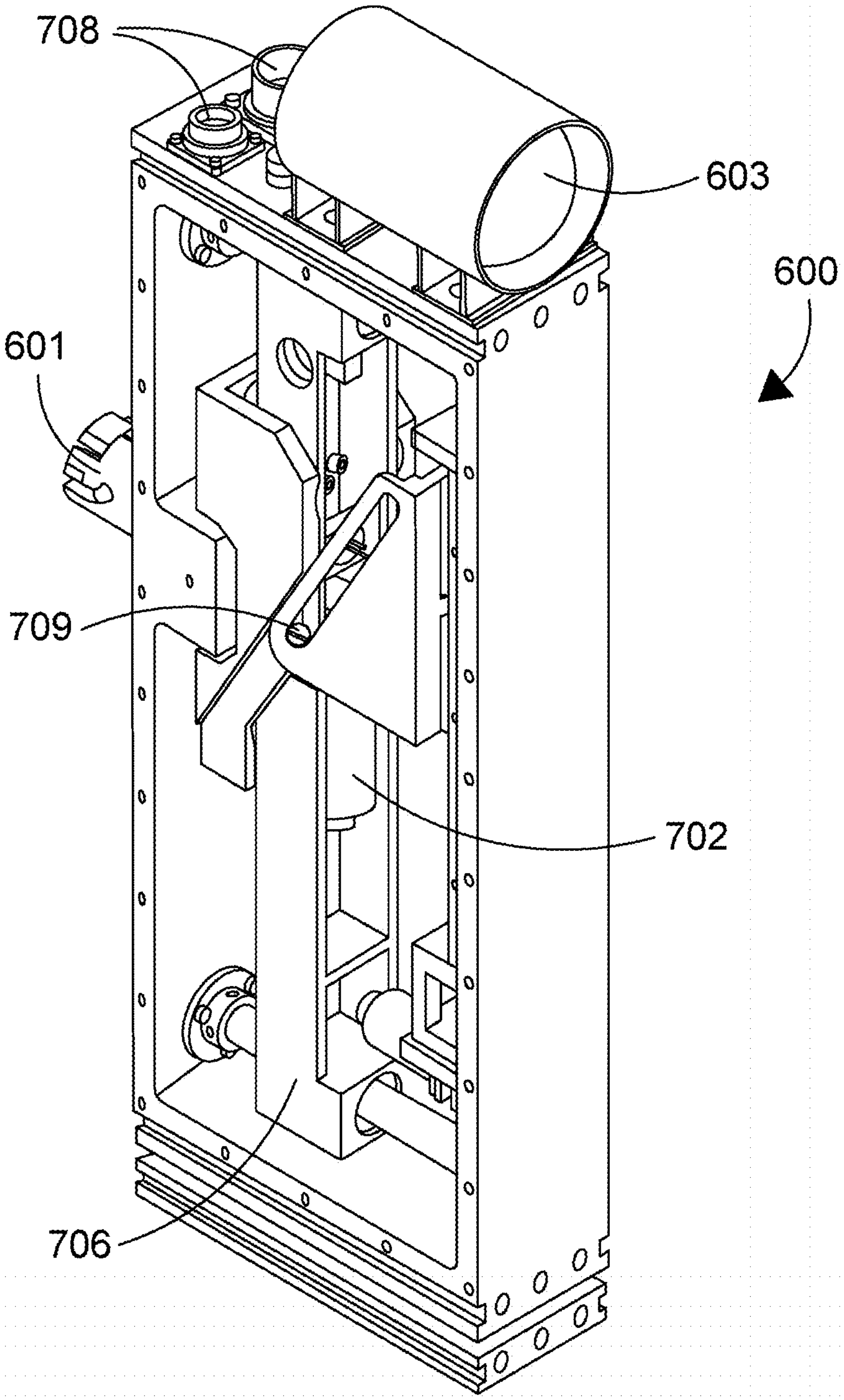
Figure 8:
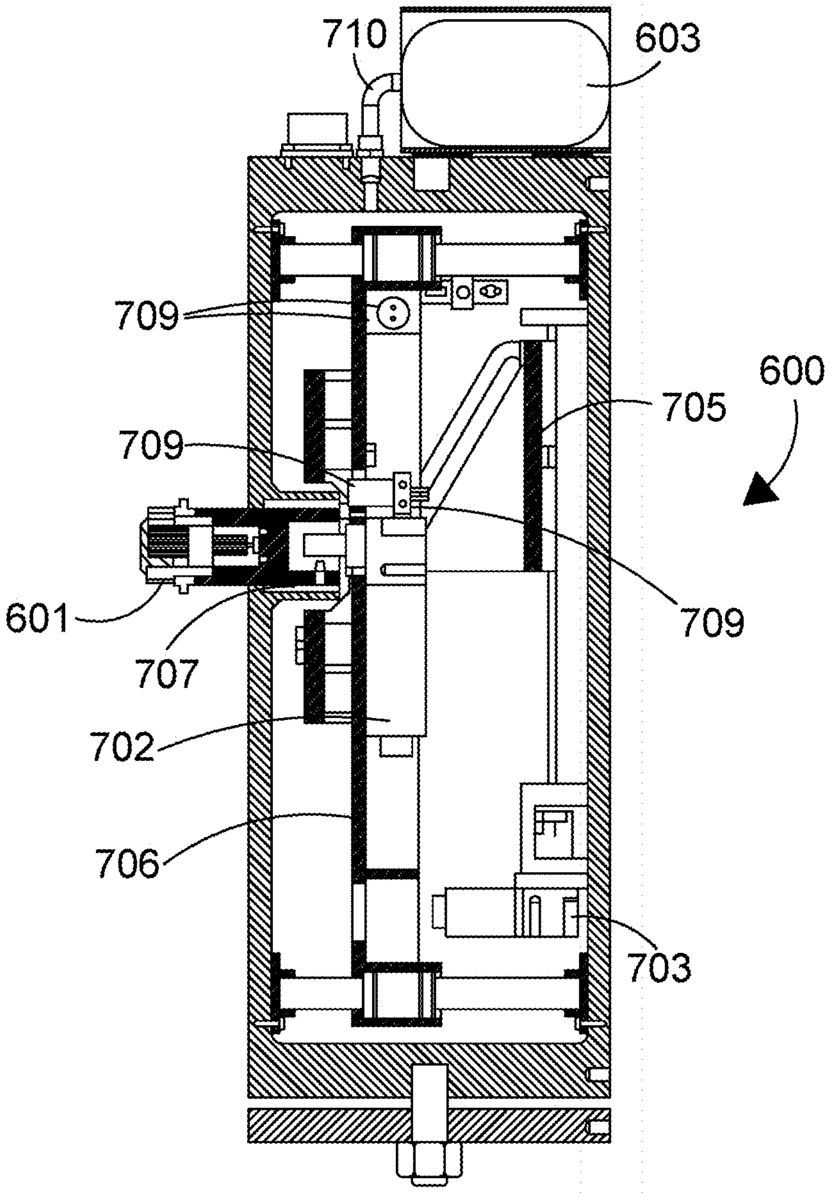
FIG. 8 shows a cross-sectional view of the RCT shown in FIGS. 7*a* and 7*b*.

FIGS. 7*a*, 7*b*, and 8 show an assembly of the nature of FIG. 6 in greater detail. In this regard, the RCT assembly 600 provides the measurement system, means for extension and retraction of a core drill bit 601, along with features to provide load bearing and damping of the forces created during measurement of the formation.

The core drill bit 601 may be any of the previously mentioned core drill bit configurations. The load bearing structure may comprise a first motor and gearbox unit 702, a second motor and gearbox unit 703, a linear guide 704, a wedge element 705, and a core drill bit support 706. These features provide a mechanism for converting rotary motion in the first or second motor and gearbox unit 702, 703 to translational movement to move the core drill bit 601 forward to perform tests on the formation. The load bearing structure further comprises bushes/bearings 707 and dynamic seals, which ensure rotational movement of the core drill bit 601 without leakage of fluid. Moreover, electrical connectors 708, 709 are coupled to provide power and to control the motors and sensors. The load bearing structure also comprises hydraulic connectors for connecting the compensator 603 and allowing initial filling of the load bearing structure with oil.

The hydraulic compensator 603 is configured to balance the internal environment of the assembly so that it substantially matches the environment outside of the load bearing structure, i.e., keeping the pressure of the lubricating oil within the assembly equal to that of the mud pressure in the annulus. The hydraulic compensator achieves this by pumping fluid into or withdrawing fluid from the load bearing structure to compensate for changes in depth that the RCT is operating at, changes in ambient temperature, and/or changes in internal volumes that change during the operation of advancing the core drill bit 601.

With the assembly in a balanced stable status, the described system allows scratching of the formation to determine UCS and F. The scratching is preferably performed in a circular motion, as opposed to a traditional linear scratch on a core sample retrieved from a well.

FIGS. 10*a*-10*d* and FIGS. 11*a*-11*d* show various views of example sharp and blunt cutters, respectively.

Figure 10A:
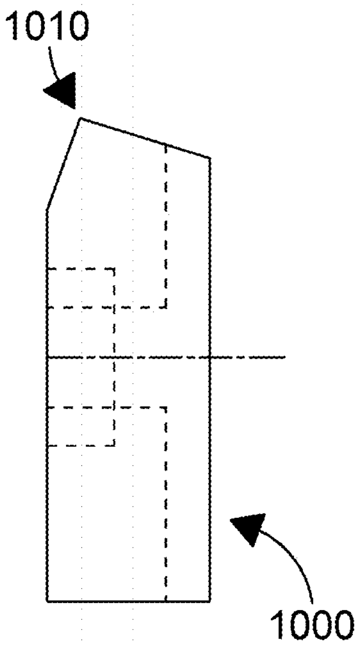
FIG. 10*a* shows a side view of an example of a sharp cutter.
Figure 10B:
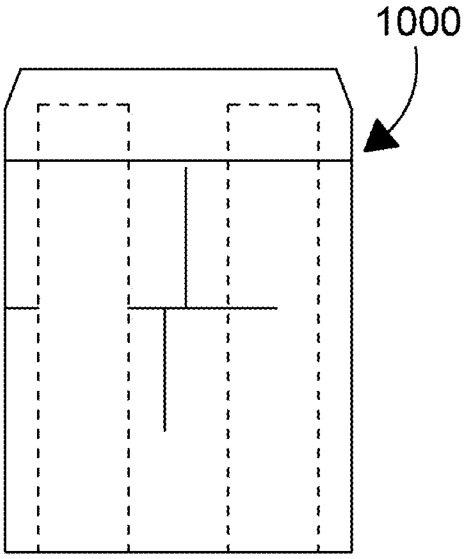
FIG. 10*b* shows a front view of the example sharp cutter of FIG. 10*a*.
Figure 10C:
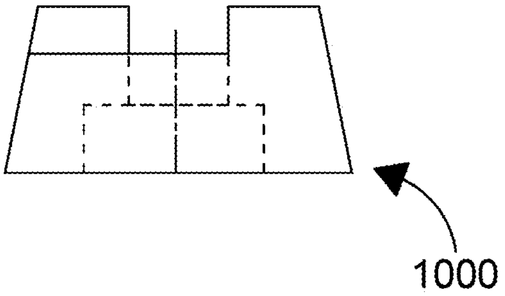
FIG. 10*c* shows a top view of the example sharp cutter of FIG. 10*a*.
Figure 10D:
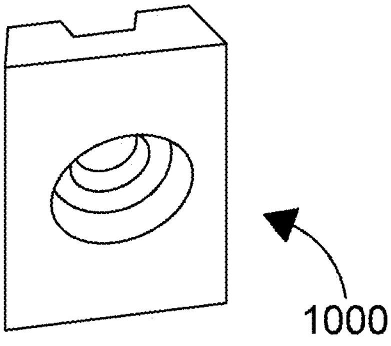
FIG. 10*d* shows an isometric view of the example sharp cutter of FIG. 10*a*.
Figure 11A:
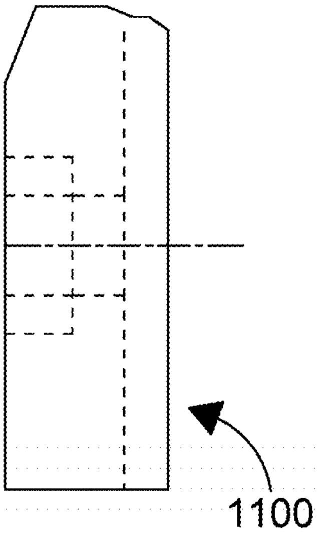
FIG. 11*a* shows a side view of an example blunt cutter.
Figure 11B:
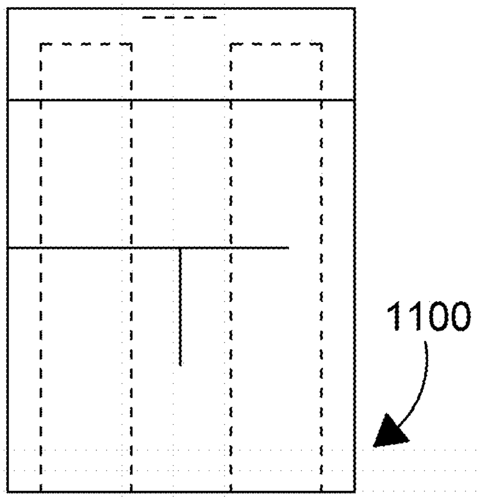
FIG. 11*b* shows a front view of the example blunt cutter of FIG. 11*a;*
Figure 11C:
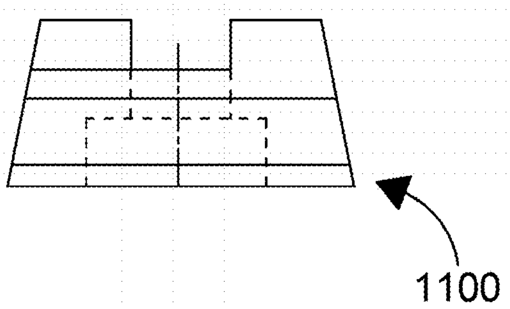
FIG. 11*c* shows a top view of the example blunt cutter of FIG. 11*a;*
Figure 11D:
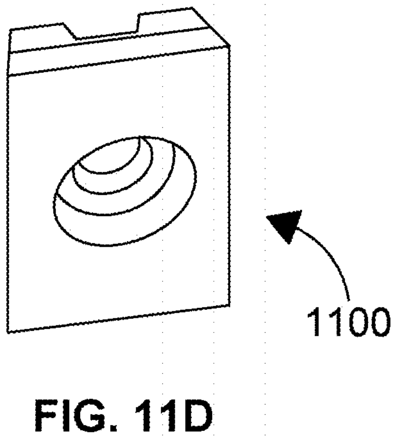
FIG. 11*d* shows an isometric view of the example blunt cutter of FIG. 11*a;*

FIG. 10*a* shows a side view of an example of a sharp cutter 1000 with a cutting edge 1010. FIGS. 10*b*, 10*c*, and 10*d* show a front view, top view, and isometric views of the sharp cutter 1000. FIG. 11*a* shows a side view of an example of a blunt cutter 1100, and FIGS. 11*b*, 11*c*, and 11*d* show front, top, and isometric views of the blunt cutter 1100. Typical dimensions for the sharp cutter 1000 are shown in FIGS. 10*a*-10*c*, and typical dimensions for the blunt cutter 1100 when using a 31.1 cm drill bit are shown in FIGS. 11*a*-11*c*. It will be appreciated that the dimensions will vary when using other sizes of drill bits, and that these exact dimensions are only an example of dimensions that would be suitable.

Figure 12A:
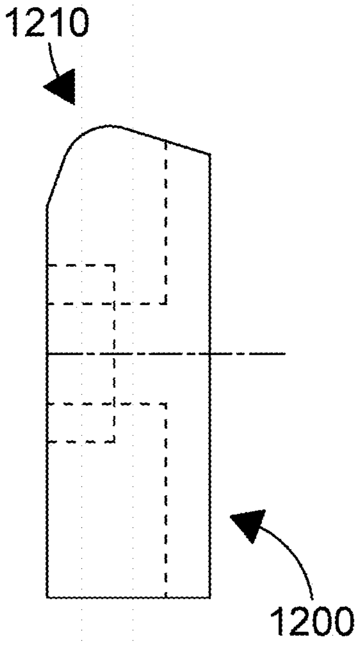
FIG. 12*a* shows a side view of an example beveled cutter.
Figure 12B:
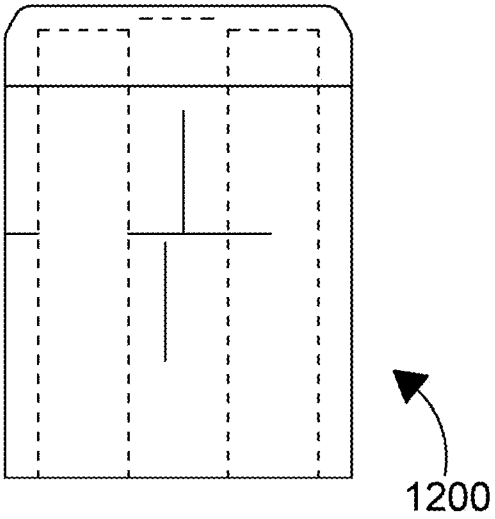
FIG. 12*b* shows a front view of the example beveled cutter of FIG. 12*a*.
Figure 12C:
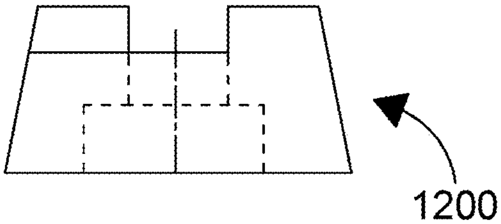
FIG. 12*c* shows a top view of the example beveled cutter of FIG. 12*a*.

As an alternative to having a distinct sharp cutter and a distinct blunt cutter, a single cutter may be provided, which can be used as both a sharp cutter and a blunt cutter. This is achieved by providing a cutter having a profiled cutting edge that is beveled. An example of such a beveled cutter 1200 is shown in FIGS. 12*a*-12*c*. The cutter 1200 can perform the function of both the sharp cutter and the blunt cutter. The bevel 1210 may have a radius in the range of 0.1 mm to 0.5 mm as appropriate. For example, a 0.1 mm, 0.3 mm, or 0.5 mm bevel may be used.

When a single cutter is used as described above, an estimate of both UCS and F can be obtained with good precision whilst reducing the measurement time required to perform the test. Furthermore, the tool is simplified by eliminating the need to move the sharp and blunt cutters into and out of their respective positions.

Running the Tool

The present invention hence relates to a module which can be installed in the drill string at the bottom-hole assembly (approximately 35-45 m from the bit). To obtain measurements of UCS and F, the tool assembly performs the following main functions in succession:

a) waiting for a valid activation command:

the device is normally in low consumption mode in which only the module responsible for detecting a valid activation command from the surface through, for example, a succession of suitably coded pressure waves or, if present in the string, through a data communication system, is activated;

on detecting such a command the module responsible for this checks its validity on the basis of predetermined criteria (for example and as a minimum condition: it checks that the string is not rotating)

if the activation command is validated, the module brings the system into operating mode, otherwise it returns to the mode awaiting an activation command b) immobilizing/supporting the system on the inner wall of the well:

the first function which the system performs in operating mode is to draw out the shoes which by bearing against the well wall create a fixing reaction for subsequent cutting and scratching operations suitable sensors and/or current measurements determine that the operation has been completed correctly, so as therefore to progress to the next function, or if negative, interrupt the procedure c) preparation (cutting) of the surface of the well wall:

the measurement subsystem (or subsystems) cause the core drill bit to come out and rotate for surface preparation the core drill bit passes through the layer of mud separating the tool from the wall and comes into contact with the formation, contact indicated by a rapid increase in the force indicated by the corresponding load cells fitted within the tool as soon as contact is made the core drill bit moves forward (rotating) to a predetermined depth (of the order of approximately 20 mm when for example, using a 31.1 cm drill bit) thus removing the potentially damaged layer of the formation through which the drill bit has passed the operation is concluded with withdrawal of the core drill bit d) "scratching" operation:

using a suitable mechanism, the measurement subsystem (or subsystems) changes over the cutters preparing the surface to the scratching cutters to measure UCS (sharp cutters) and F (blunt cutters)

the core drill bit comes out again into contact with the wall of the previously "prepared" formation the core drill bit performs scratching operations in succession, over variable depths and lengths according to the predetermined program the operation concludes with return of the core drill bit e) release from the wall on re-entry into the envelope of the housing:

the locking system causes the shoes to retract f) processing of measured formation parameters (UCS and F) in their original tensional state:

the system processes the measurements on the basis of a predetermined code the system makes a record in internal memory and possibly communicates with the surface (if a communication system is available)

g) stand-by awaiting the next activation command:

the system enters low consumption mode, awaiting a new activation command.

The "scratching" operation as described in paragraph d) is carried out on an operating principle similar to that of a conventional laboratory tool, such as EpsLog's Wombat: the demolition of definite quantities (volumes) of rock to measure its UCS and F using two sets of suitably shaped cutters for the two different measurements.

A main difference distinguishing the two (bottom-hole measuring component vs. laboratory tool), in addition, to the different measurement conditions (bottom hole characterized by high pressures and high temperatures vs. laboratory, and therefore environmental temperature and pressure) is the manner in which the mechanical action of scratching on the formation is performed, which is circular in the case of the former component and linear in the latter.

A possible embodiment of the invention provides for the use of two adjacent measurement subsystems, one used to determine UCS and one to determine F. It is preferable that these systems are close together to ensure that they measure the two parameters at two points in the same formation.

In order to ensure greater stability during measurement, one or more immobilizing/supporting systems on the inner wall of the well may be provided.

These systems are intended to react to the force generated by the measurement tools as they interact with the formation.

Further components also have the object of ensuring proper functioning of the system and ensuring that the system has the correct power, which, in the solution proposed, is envisaged as batteries.

Figure 9B:
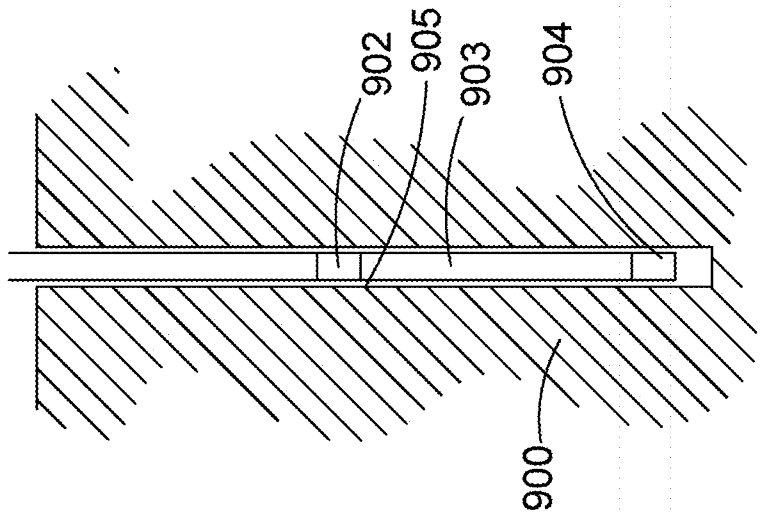
FIG. 9*b* shows the RCT of FIG. 9*a* positioned at the test site to perform tests on the formation.
Figure 9A:
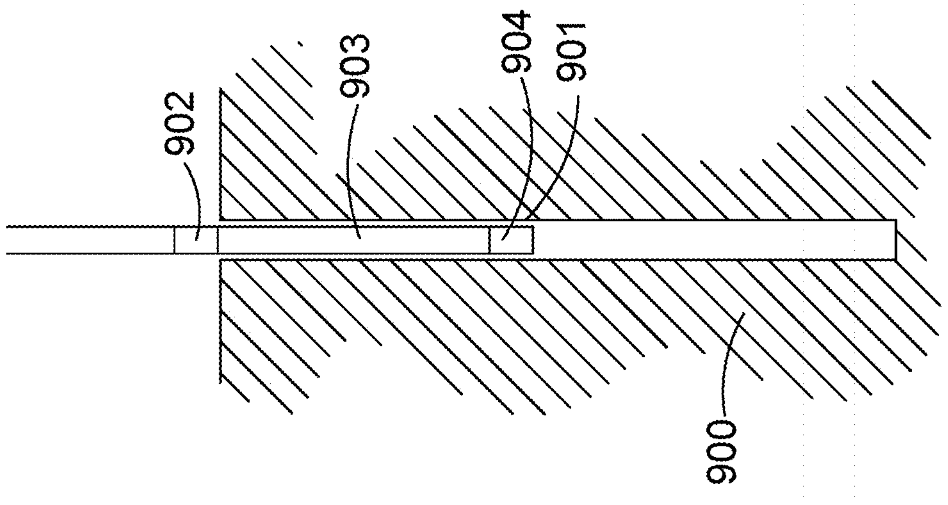
FIG. 9*a* shows an RCT according to the present invention being run into a well to perform tests on a test site of the formation, in accordance with an aspect of the invention.

A method of performing a test to determine UCS and F of a formation 900 at a point in a well 901 is now described with reference to FIGS. 9*a* and 9*b*.

An RCT 902 in accordance with any of the previously described embodiments is provided in a bottom-hole assembly 903 around 35-45 m from the drill bit 904, and is run into the well 901 to the desired location 905 to perform the rock characterization tests—i.e., to perform tests to determine UCS and F. The RCT 902 is then communicated with via mud pulse telemetry from the surface to awaken the RCT 902 from the low power consumption mode. The RCT 902 subsequently extends shoes into the well 901, which create a force against which the RCT 902 can press to perform tests on the well 901. Sensors within the RCT 902 determine if the shoes have been set adequately to move on to the step of preparing the formation for testing and performing tests on the formation.

Preparing the Formation

If the shoes have been set adequately, the measurement subsystem of the RCT 902 causes the core drill bit (not shown in FIGS. 9*a* and 9*b*) to come out of the load bearing structure and rotate for surface preparation—i.e., for removal of the mud cake/debris layer. The core drill bit will ultimately come into contact with the formation after removal of the layers of debris. The RCT 902 detects when the core drill bit has contacted the formation by a rapid increase in the force indicated by the load cells fitted within the RCT 902. The core drill bit can then advance a predetermined distance into the formation (typically around 20 mm) to remove the potentially damaged or disturbed layer of the formation through which the drill bit has passed when drilling that part of the well. The core drill bit is then withdrawn to leave a part of the formation ready for testing.

The RCT 902 has one of the previously described configurations of cutters and mechanisms to switch between which cutters are foremost. Using the mechanism, the surface preparation cutters are retracted, and the testing cutters are brought to the fore. The testing cutters on the core drill bit are then brought into contact with the formation to be tested. The testing cutters can then perform a scratching operation on the formation to determine UCS and/or F. The testing cutters perform this operation according to a predetermined program or routine, which is either predetermined and preprogrammed into the tool or sent from the surface in a command to the tool.

Data Acquisition and Transmission

When the required data has been collected during the scratch test, the data may be processed in the RCT 902 or may be sent to the surface via mud pulse telemetry or another communication means, where it can be processed for evaluation. The RCT 902 also stores the recorded data, possibly together with time, temperature, vibrational data, etc., in its internal tool memory, which can be downloaded to produce high quality data at the surface when the tool is recovered from the well and the BHA is dismantled.

Re-Testing or Withdrawal

If required, more scratch tests can be performed; otherwise, the core drill bit and supporting shoes are retracted from the formation back into the load bearing structure. Typically, the RCT 902 will then enter a low power consumption mode and await a new activation command.

The present invention disclosed herein provides both a method of analyzing rock characteristics and also a rock characterization tool (RCT) and assembly which can be used to perform that method.

As a result, the method, tool and assembly of the present invention afford the following advantages:

- an improvement in the wellbore stability model through the possibility of measuring formation UCS and F parameters directly on the inner wall of the well under their original tensional state during the drilling stage;
- the possibility of obtaining a greater number of characterizations than with coring, especially in environments which are usually not cored;
- reduced costs due to the possibility of avoiding coring operations;
- reduced costs through reducing non-productive time, thanks above all to the following aspects:
- no slowing down of drilling work, in that it is envisaged that the invention will be used while changing drilling rods with active circulation;
- no lengthening of waiting times for results from the measurement of formation UCS and F, in that the values acquired and stored directly by the invention on site are for example available after every change of bit; and
- increased operating safety in that all the actions associated with obtaining downhole cores from the well and their subsequent handling/movement and all laboratory activities are avoided.

In this connection, the tool of the present invention can be used to directly measure formation UCS and F parameters downhole under their original tensional state through one or more measuring devices housed directly within a module, which can be installed in the drill string in the bottom-hole assembly.

The tool can be activated from the surface through, for example, a succession of suitably coded pressure waves or, if present in the string, through a data communication system.

On receipt of the activation command, the system works in completely independent mode, performing the envisaged operations and measurements in succession during the time needed for a change of drill rod, without any action by the operator, and ensuring the safety of operations.

Moreover, the data recorded and saved on site may be subsequently available, for example, at every bit change or available in real time if a data communication system is present in the string.

Calculation of the unconfined compressive strength and internal friction angle can be achieved using the same theory as in prior art systems, which test the rock characteristics at the surface, such as the Wombat system. The present invention has a further benefit of cost reduction due to the improvement of wellbore stability models and a reduction in non-productive time.

The invention claimed is:

1. A downhole tool for performing downhole rock characterization tests on a test site of a formation, the downhole tool comprising:

at least one surface preparation cutter;

at least one testing cutter;

at least one force sensor;

at least one torque sensor, wherein the at least one surface preparation cutter is configured to remove debris from between the test site and the downhole tool so that the at least one testing cutter can engage the test site, wherein the at least one force sensor and the at least one torque sensor are configured to determine a force and a torque measurement at the at least one testing cutter, respectively.

2. The downhole tool of claim 1, wherein the at least one surface preparation cutter is further configured to remove a layer of the test site.

3. The downhole tool of claim 2, wherein the at least one surface preparation cutter can be pre-set to remove a layer deep enough to remove any damaged formation which would not be suitable for performing tests with the testing cutter.

4. The downhole tool of claim 1, wherein the at least one testing cutter comprises a blunt cutter edge that is sufficiently blunt to perform an internal friction angle test.

5. The downhole tool of claim 1, wherein the at least one testing cutter comprises a sharp cutter edge that is sufficiently sharp to perform a uniaxial (unconfined) compressive strength test.

6. The downhole tool of claim 1, wherein the at least one testing cutter comprises a sharp cutter edge configured to perform a uniaxial (unconfined) compressive strength test, and a blunt cutter edge configured to perform an internal friction angle test.

7. The downhole tool of claim 1, wherein the at least one surface preparation cutter is configured to rotate about an axis to perform a surface preparation.

8. The downhole tool of claim 1, wherein the at least one testing cutter is configured to rotate about an axis to perform an internal friction angle test and/or a uniaxial (unconfined) compressive strength test.

9. The downhole tool of claim 8, wherein the at least one surface preparation cutter is configured to clear an area of the formation, and wherein the at least one testing cutter is configured to engage an area within the cleared area.

10. The downhole tool of claim 1, wherein the at least one testing cutter has a profiled edge that has a portion comprising a blunt cutter edge and another portion comprising a sharp cutter edge, wherein the blunt cutter edge is blunt enough to perform an internal friction angle test, and wherein the sharp cutter edge is sharp enough to perform a uniaxial (unconfined) compressive strength test.

11. The downhole tool of claim 1, wherein the at least one surface preparation cutter comprises a plurality of surface preparation cutters, and wherein the at least one testing cutter comprises a plurality of testing cutters.

12. The downhole tool of claim 1, wherein the at least one surface preparation cutter and the at least one testing cutter are mounted to enable relative movement so that they are selectively positionable between an active cutting state and passive retracted state.

13. The downhole tool of claim 12, wherein the at least one surface preparation cutter and the at least one testing cutter are configured to move relative to each other by one or more of a hydraulic piston arrangement or an electrical arrangement.

14. The downhole tool of claim 1, wherein the at least one surface preparation cutter is selectively moveable from a first position of the downhole tool for removing debris to a second position of the downhole tool to allow the at least one testing cutter to engage the formation to perform a test.

15. The downhole tool of claim 14, wherein the at least one testing cutter is selectively moveable from the first position of the downhole tool in which the at least one surface preparation cutter can remove debris to the second position of the downhole tool in which the at least one testing cutter can engage the formation to perform the test.

16. The downhole tool of claim 15, wherein the at least one surface preparation cutter and the at least one testing cutter are mechanically linked so that movement of the surface preparation cutter from the first position of the downhole tool to the second position of the downhole tool causes movement of the testing cutter from the first position to the second position.

17. The downhole tool of claim 1, further comprising a core drill bit configured to translate the at least one surface preparation cutter and the at least one testing cutter to the test site.

18. The downhole tool of claim 17, wherein the core drill bit is translated in a direction substantially perpendicular to an axial direction of a well at the test site.

19. A downhole tool assembly comprising the downhole tool of claim 1, the downhole tool assembly comprising a load bearing structure, within which components of the downhole tool can be isolated from a well environment, and one or more characteristics of the well environment within the load bearing structure being adjustable to match those of the well environment.

20. The downhole tool assembly of claim 19, wherein the one or more characteristics include one or more of pressure and temperature.

21. The downhole tool assembly of claim 19, further comprising a core drill bit that is configured to move from within the load bearing structure to outside the load bearing structure.

22. The downhole tool assembly of claim 19, further comprising a compensator configured to pump fluid into or out of the load bearing structure such that an internal pressure of the load bearing structure is balanced with a local external pressure of the load bearing structure.

23. The downhole tool assembly of claim 19, further comprising a deployable immobilizing means for bracing the downhole tool assembly against a well interior.

24. The downhole tool assembly of claim 23, wherein the deployable immobilizing means comprises one or more shoe components for bearing against a well wall for creating a fixing reaction during testing operations.

25. The downhole tool assembly of claim 19, further comprising a connection means for connecting to drill pipe or tools of a bottom hole assembly.

26. The downhole tool assembly of claim 19, further comprising a power module to deliver power to a motor for translating a drill core bit to the test site.

27. The downhole tool assembly of claim 26, wherein the power module is a battery.

28. The downhole tool assembly of claim 19, further comprising a processing means for calculating an internal friction angle or a confined compressive strength from the force and the torque measurement.

29. A method of performing a rock characterization test on a test site within a wellbore, the method comprising the steps of:

arranging a downhole tool in accordance with claim 1 or a downhole tool assembly downhole in a well, the downhole tool assembly comprises the downhole tool of claim 1 and a load bearing structure, within which components of the downhole tool can be isolated from a well environment, and one or more characteristics of the well environment within the load bearing structure being adjustable to match those of the well environment;

translating the at least one surface preparation cutter to a test site, to remove debris located along a translational path;

translating the at least one testing cutter to the test site; and engaging the testing cutter with the test site.

30. The method as claimed in claim 29, wherein, once positioned downhole at the test site, the downhole tool assembly is pressure balanced such that measurement components are encapsulated within an enclosure that is pressured to match a local environmental pressure.

31. The method of claim 29, further comprising the steps of:

engaging a blunt cutter with the test site;

measuring a force along a rotational axis of the blunt cutter; and measuring a cutting torque at the blunt cutter.

32. The method of claim 29, further comprising the steps of:

engaging a sharp cutter with the test site;

measuring a force along a rotational axis of the sharp cutter; and measuring a cutting torque at the sharp cutter.

33. The method of claim 29, further comprising calculating an internal friction angle from a force along a rotational axis of a blunt cutter and a measured cutting torque at the blunt cutter.

34. The method of claim 29, further comprising calculating a uniaxial (unconfined) compressive strength from a force measured along a rotational axis of a sharp cutter and a measured cutting torque at the sharp cutter.

35. A cutter for use in the downhole tool of claim 1 or a downhole tool assembly that comprises the downhole tool of claim 1 and a load bearing structure, within which components of the downhole tool can be isolated from a well environment, and one or more characteristics of the well environment within the load bearing structure being adjustable to match those of the well environment, wherein the cutter has a profiled cutting edge that is beveled so that it can perform both blunt and sharp cutter functions.

36. The cutter of claim 35, wherein the profiled cutting edge has a bevel with a radius of between 0.1 and 0.5 mm.

* * * * *